United States Patent [19]
Goldhaber et al.

[11] Patent Number: 5,794,210
[45] Date of Patent: Aug. 11, 1998

[54] ATTENTION BROKERAGE

[75] Inventors: A. Nathaniel Goldhaber; Gary Fitts, both of Berkeley, Calif.

[73] Assignee: CyberGold, Inc., Berkeley, Calif.

[21] Appl. No.: 570,510

[22] Filed: Dec. 11, 1995

[51] Int. Cl.$^6$ ........................................... G06F 17/60
[52] U.S. Cl. ........................ 705/14; 705/7; 705/10; 707/501; 707/513; 395/200.47; 395/200.48; 395/200.49
[58] Field of Search ................. 395/201, 207, 395/210, 214, 226, 227, 235, 239, 200.47, 200.48, 200.49; 705/7, 10, 14; 707/501, 513

[56] References Cited

U.S. PATENT DOCUMENTS

| | | | |
|---|---|---|---|
| 3,639,686 | 2/1972 | Walker et al. | 380/10 |
| 3,769,579 | 10/1973 | Harney | 348/4 |
| 4,331,973 | 5/1982 | Eskin et al. | 348/13 |
| 4,546,382 | 10/1985 | McKenna et al. | 348/13 |
| 4,602,279 | 7/1986 | Freeman | 348/10 |
| 4,630,108 | 12/1986 | Gomersall | 348/13 |
| 4,646,145 | 2/1987 | Percy et al. | 348/13 |
| 4,658,290 | 4/1987 | McKenna et al. | 348/1 |
| 4,745,468 | 5/1988 | Von Kohorn | 348/13 |
| 4,791,281 | 12/1988 | Johnsen et al. | 395/214 |
| 4,799,156 | 1/1989 | Shavit et al. | 395/226 |
| 4,805,020 | 2/1989 | Greenberg | 348/460 |
| 4,850,007 | 7/1989 | Marino et al. | 379/67 |
| 4,872,113 | 10/1989 | Dinerstein | 395/210 |
| 4,876,592 | 10/1989 | Von Kohorn | 348/13 |
| 4,926,255 | 5/1990 | Von Kohorn | 348/13 |
| 4,967,273 | 10/1990 | Greenberg | 348/460 |
| 4,970,681 | 11/1990 | Bennett | 395/603 |
| 4,972,504 | 11/1990 | Daniel, Jr. et al. | 395/210 |
| 4,982,346 | 1/1991 | Girouard et al. | 395/214 |
| 5,025,372 | 6/1991 | Burton et al. | 705/14 |
| 5,034,807 | 7/1991 | Von Kohorn | 348/13 |
| 5,057,915 | 10/1991 | Von Kohorn | 463/9 |
| 5,114,128 | 5/1992 | Harris, Jr. et al. | 270/1.03 |
| 5,128,752 | 7/1992 | Von Kohorn | 395/210 |
| 5,155,591 | 10/1992 | Wachob | 348/9 |
| 5,191,410 | 3/1993 | McCalley et al. | 348/13 |

(List continued on next page.)

FOREIGN PATENT DOCUMENTS

| | | |
|---|---|---|
| 0 265 232 | 4/1988 | European Pat. Off. . |
| WO95/16971 | 6/1995 | WIPO . |
| WO96/39668 | 12/1996 | WIPO . |

OTHER PUBLICATIONS

Stephen D. Solomon, *The New York Times Magazine*, "American Express Applies For a New Line of Credit," pp. 34, 36–38, 44 and 47.

*Primary Examiner*—Gail O. Hayes
*Assistant Examiner*—Stephen R. Tkacs
*Attorney, Agent, or Firm*—Nixon & Vanderhye P.C.

[57] ABSTRACT

A system provides for the immediate payment to computer and other users for paying attention to an advertisement or other "negatively priced" information distributed over a computer network such as the Internet. Called Attention Brokerage, this is the business of brokering the buying and selling of the "attention" of users. A further invention, Orthogonal Sponsorship, allows advertisers to detach their messages from program content and explicitly target their audience. A special icon or other symbol displayed on a computer screen may represent compensation and allow users to choose whether they will view an ad or other negatively priced information and receive associated compensation. Targeting users may be provided by reference to a data base of digitally stored demographic profiles of potential users. Information can be routed to users based on demographics, and software agents can be used to actively seek out users on a digital network. Private profiles may be maintained for different users and user information may be released to advertisers and other marketers only based on user permission. Users may be compensated for allowing their information to be released. Competing advertisers may "bid" for the attention of users using automatic electronic systems, e.g., "an auction" protocol and these concepts can be generalized to provide an electronic trading house where buyers and sellers can actively find each other and negotiate transactions.

86 Claims, 14 Drawing Sheets

U.S. PATENT DOCUMENTS

| | | | |
|---|---|---|---|
| 5,201,010 | 4/1993 | Deaton et al. | 382/139 |
| 5,220,501 | 6/1993 | Lawlor et al. | 380/24 |
| 5,227,874 | 7/1993 | Von Kohorn | 395/210 |
| 5,283,731 | 2/1994 | Lalonde et al. | 395/201 |
| 5,283,734 | 2/1994 | Von Kohorn | 463/17 |
| 5,287,181 | 2/1994 | Holman | 348/473 |
| 5,305,195 | 4/1994 | Murphy | 395/201 |
| 5,347,632 | 9/1994 | Filepp et al. | 395/200.09 |
| 5,438,355 | 8/1995 | Palmer | 348/1 |
| 5,438,356 | 8/1995 | Ushiki et al. | 348/12 |
| 5,446,919 | 8/1995 | Wilkins | 455/6.2 |
| 5,467,269 | 11/1995 | Flaten | 705/14 |
| 5,500,681 | 3/1996 | Jones | 348/473 |
| 5,502,636 | 3/1996 | Clarke | 395/210 |
| 5,515,098 | 5/1996 | Carles | 348/8 |

Positively Priced Information

Negatively Priced Information

CyberCoin

Linked Sponsorship

Orthogonal Sponsorship

Example Consumer Database

Demographic Routing

Attention Brokers

Ad/Profile Agent Views

User View

Trading House Agent Views

5,794,210

ATTENTION BROKERAGE

FIELD OF THE INVENTION

The present invention relates to techniques for delivering information electronically, and more particularly, to techniques for delivering positively and negatively priced intellectual property (including advertising). Still more particularly, the present invention relates to systems and methods for attention brokering, orthogonal sponsorship and/or privacy protection in an electronic information delivery network.

BACKGROUND AND SUMMARY OF THE INVENTION

Historically, advertising has involved a battle of wits between advertiser and consumer. In the mass media, producers of products and services vie with each other to capture the attention of potential consumers, while those same consumers (although generally endorsing the idea of advertising as a way of keeping entertainment and information costs down) strive to evade as many advertising messages as they can. Consumers press the mute button on their TV remotes and "zap" advertisements by flipping between channels, they mentally tune out or "zap" radio commercials, they flip advertising pages of a newspaper or magazine without paying any attention to them, and they subscribe to non-commercial information and entertainment media. Rare indeed is the consumer who actually enjoys being at the receiving end of mass-media advertising.

This state of affairs is not accidental. It is an inevitable result of the environment in which advertising came of age. To make contact with the relatively small percentage of people who might actually want to use a product or service, mass-media advertising has to impact everyone who uses the medium. For example, every reader of the New York Times has to see (though not necessarily read) the display ad for Macy's; every viewer of popular television programs such as "Roseanne" has to sit through (though not necessarily pay attention to) the commercial for Diet Coke.

Although the concept of a consumer's attention as a commodity with intrinsic value has only recently entered public discussion, it has long been implicit in advertising, marketing, and public relations. Since advertisers know that only a small percentage of the audience has a real interest in the product or service being sold, they have learned to rely on entertainment values—constant repetition, snappy jingles, blaring headlines, and sex—to attract the attention of the audience and thereby sell their wares.

In the traditional mass media advertising model, mass media (e.g., television networks, radio stations, newspapers and magazines) develop particular content of interest to certain classes of consumers. The mass media also develops and provides a mechanism to deliver the content to as many potential consumers as possible (e.g., over the air or by cable transmissions, by mass distribution of print media copies, etc.). The mass media may charge audience members for content delivery (e.g., magazine or newspaper subscription fees, cable television subscription fees, or "pay per view" fees), but mass media typically receives most of its revenue from advertisers.

Advertising "sponsorship" in this traditional mass media advertising model has been a mechanism by which economic value is passed indirectly from an advertiser to a consumer. Advertisers "sponsor" content by paying the mass media to deliver their advertisements with the content. Traditionally, advertisers often want their advertisements inextricably embedded within the content itself so the advertisements are more certain to reach the mass media audience. For example, some advertisers have television and radio commentators work advertising "pitches" into their commentary. Other advertisers have televised/photographed race car drivers emblazon their cars with advertising slogans. Still other advertisers have film actors or actresses use the advertiser's products as part of their role playing. Moreover, the now-standard technique of pacing commercial television programming to intersperse advertising at various points within the programming is designed to make it more difficult for viewers to not pay attention to the advertisements.

For the most part, ads in the mass media have been designed to appeal to as many potential consumers as possible. At best, an advertising agency may plan a handful of different approaches based on demographics. For example, one soft-drink ad, aimed at the teenage audience, might employ cutting-edge video graphics and be shown on MTV, while another, using nostalgic poster art from the Stage Door canteen, might be placed in Life magazine to target an older audience. But this type of individualization is very limited Because of the lack of focus inherent in mass communication, today's print and television advertising uses the concept of "linked sponsorship." "Linked sponsorship" embeds ads within or accompany (sponsor) content most likely to reach the advertisers' target audience. For example, television shows are often designed to appeal to a particular audience, and usually have specific sponsors that explicitly support the show. In print media, advertisers choose magazines and newspapers whose editorial policies or geographic coverage attract readers likely to be interested in the advertisers' products. These techniques allow the advertisers to "target" their advertisements to a subset of the general population that may be more likely to respond to the advertisements.

As an example, a lingerie company may know that its products are purchased by a certain demographic group, e.g. mostly mid-to-upper class white women ages 18–35. When the lingerie company wants to advertise a new line of products, it may choose to link its ads to a TV program like Melrose Place (a television situation comedy aimed at young women) and to a young women's magazine—both of which appeal to young women in the socio-economic and age demographics the lingerie company wants to sell its product to. By linking its ads to content being delivered to an audience of mostly mid-to-upper class white women ages 18–35, the lingerie company can be assured that its advertising is delivered to the consumers most likely to purchase its products.

The advertising practices described above have a number of drawbacks, both for the advertiser and for society at large. The primary drawback for the advertiser is lack of efficiency. Mass media advertising is inherent both over-inclusive and under-inclusive. For example, the lingerie ads aired during Melrose Place are not delivered to many consumers who are prime candidates for purchasing the product (for example, fashion conscious women who buy a lot of lingerie but don't like Melrose Place and/or don't watch television). In addition, the advertisements are delivered to many consumers (e.g., men who watch Melrose Place) who have no interest in purchasing the products being advertised. From the advertiser's point of view, a lingerie company could advertise more efficiently if it could directly reach women who are explicitly interested in lingerie (or clothes, or fashion).

Society at large is also harmed by this lack of efficiency. As one example, television programming has, to a very large extent, become dictated by factors that will make it appeal to the largest possible audience so it can generate the largest possible advertising revenue. The result is a decrease in the overall diversity of information available and an alarming increase in the homogeneity and "lowest common denominator" appeal of mass media programming. Unlinking sponsorship from the content of the sponsored entertainment or service would benefit the consumer and would also provide broad benefits to society such as greater freedom of speech and making a larger diversity of opinions available to the public.

Advertisers have used targeted direct mailings and niche print media to overcome some of these problems. Direct mailings and niche magazines can be used to target specific potential purchasers or classes of purchasers. For example, the lingerie company can use mass mailings to deliver its advertising materials directly to fashion-conscious young women with income above a certain level. Skateboard companies can advertise in a small number of magazines directed to skate board enthusiasts. While these techniques can be very effective, they cannot provide moving images and sound that can be used to create truly unforgettable, high impact messages.

Advertisers also have come to rely on techniques for giving consumers an incentive (e.g., "money saving" coupons and discount offers) to encourage consumers to purchase their wares. For example, if the lingerie company passes along a dollar to each targeted woman to attract her attention, she may in turn spend that dollar to purchase lingerie. The lingerie company can provide, by way of mass mailings or through printed media, coupons or discount sales offers to give the recipients a strong incentive to purchase the company's lingerie. Some advertisers mail direct payments to consumers (e.g., dollar bills, checks, or other rebates). The consumer can use these direct payments to help pay for purchasing the advertiser's goods, or to purchase other related or unrelated goods or services. Although these techniques can be effective, they cannot be used with television, radio and other popular forms of mass communication.

The Internet is the first medium that can claim to be both "mass," in the sense that it reaches millions of people all over the globe, and "specialized," in the sense that its technology is capable of targeting information directly to the individual consumer. This is such a fundamental change from all previous information technologies that it has the potential to transform the advertising transaction into an alliance between consumer and advertiser, based on mutual respect and mutual benefits.

The Internet is a system of linked computers that permits fast, low-cost, global communication, entertainment, and information exchange. The Internet may be considered the test-bed for a "Future Net" which will likely encompass the functions now provided by today's Internet, cable and broadcast television, telephone communications (including voice and picture) and other linear and interactive business, telecommunication and entertainment systems. This "Future Net" may be a single network or an amalgamation of two or more independent networks. It is likely that new forms of entertainment and business will emerge, made possible by the Future Net.

Even with the current form of the Information Superhighway (Internet, cable television, video conference, "zines" created by desktop publishing, etc.), competition for the public's time and attention will become increasingly keen. Consumers with hundreds of competing, independent, and widely distributed sources of entertainment and information to choose from will no longer be the passive prisoners of advertising messages that they were in the era of the centralized mass media. So far, however, advertising has been only a marginal—and somewhat unwelcome—presence on the Information Superhighway.

Many consumers of the Information Superhighway view the recent advent of advertising to the wide open spaces of the Internet with deep suspicion and an almost instinctive aversion. But the kind of advertising the skeptics are thinking about—and rejecting—bears little resemblance to the advertising of the future.

The present invention provides a new approach to advertising for the digital age. Advertising in accordance with the present invention is based on the new realities of communication and commerce on the Internet, on-line services, the Future Net, and other computer networks, including networks that distribute information via physical media such as CD-ROM.

The innovations provided by the present invention have the potential to turn what has historically been an uneasy and sometimes hostile stand-off between advertiser and consumer into an alliance based on mutual respect and mutual benefits. The approach provided by the present invention is based on four principles:

attention, interest, sponsorship, and privacy.

Attention

A fundamental premise underlying the present invention is the idea that a consumer's attention is a valuable commodity. The present invention will allow advertisers to pay consumers directly for their time and attention. The notion of direct, immediate payment in this context is new. The rationale for direct payment, from the advertiser's point of view, is that direct payment is a cost-effective way of getting the attention of targeted customers as compared to mass-media advertising.

The present invention provides mechanisms for "attention brokerage"—the business of buying and selling (brokering) the "attention" of consumers. Attention brokerage establishes a market that allows advertisers to compete for the attention of a particular consumer or group of consumers—thereby maximizing efficiency and creating value.

"Negative pricing" is one means by which advertisers could compete for available attention in the system provided in accordance with the present invention. In its simplest form, negative pricing is a "passive" competition: advertisers make fixed offers and viewers select among them. Another innovative idea is "attention bidding," a mechanism by which advertisers actively compete by bidding for a viewer's attention. These bids might be based, in part, on estimates of the viewer's interest and likelihood to buy—estimates derived from access to the viewer's electronic profiles detailing preferences and past consuming behavior. Bids might also be based on other bids, via an "auction" protocol by empowered bidding "agents." The bidding may be explicit or automatic. Viewers may elect to have advertisers bid for their attention or the system may offer bidding without the viewers' knowledge.

Interest

As discussed above, traditional advertising was both under-inclusive and over-inclusive. In contrast, technology provided in accordance with the present invention permits the design of ads that are virtually custom-fitted to consumer preferences, thus ensuring that the ad messages will be welcomed and attentively viewed by the consumer. This ability to finely target (and customize) ads based on the interests of particular individual consumers maximizes efficiency and benefits both the advertisers and the consumers.

For example, when selecting ads for viewing, the consumer would be given the chance to express a preference for certain kinds of ad content. For example, if the consumer is shopping for a computer, he/she might ask to see an advertisement that provides straightforward technical specifications of specific models or configurations. For a movie commercial, one consumer might request a film clip while another asks for a plot summary. Some consumers might enjoy the entertainment value of celebrity-spokesperson ads, while a consumer viewing an ad for food or drink might ask for a list of ingredients or nutrients.

A related innovation, "demographic routing," is a mechanism by which an information package or its agent (or an agent for any goods or service) can be routed directly to interested and willing buyers. Conceptually, this is an addressing mechanism that can be used to route the information to more than one individual, e.g., to all users who are demographically suitable (e.g.,"anyone who fits the following profile").

Sponsorship

Since all the ads on the list will be targeted to the consumer's needs, interests, and preferences, it is very likely that she would be inclined to view them even without a cash incentive. However, the system provided by the present invention will offer her one. The present invention provides a "consumer interface button"—for example, the image of a little gold coin ("CyberCoin") next to each title on a list. This use of a consumer interface button—the "CyberCoin"—though reminiscent of the prior art "gems" in video game adventures, is innovative and unique in that it transfers real value.

The "CyberCoin" transaction reflects a radical and innovative change in the meaning of sponsorship. In effect, the advertisers have elected to sponsor the consumer who selects the CyberCoin—that is, they have chosen to pay the consumer directly for her attention rather than using the same funds for mass-market ad campaigns that are far less likely to hit the mark. Thus, the present invention provides a method of separating advertising sponsorship from the editorial content of the medium in which the advertising appears. We call this ability to decouple the advertising content from other content "orthogonal sponsorship."

The technology offered by the present invention breaks (or make inexplicit) the link between the ad and the content of the sponsored material. Advertisers will not necessarily know what content of entertainment or information they are sponsoring. Instead, advertisers will simply provide ads to the service, explicitly delineate their target audience, and offer some form of compensation for time and attention directly to those viewers willing to "view" ads.

In orthogonal sponsorship, how will advertisers know that they are getting their money's worth? What is to prevent a consumer from clicking the CyberGold button, collecting the credit, and NOT reading the ad? The system provided by the present invention can, as one example, have a built-in system of incentives and checks—a "carrot and stick" approach—to solve this problem. The "carrot" in this example is the consumer's interest in the product or service, which will make him or her unlikely to ignore the ad once it is presented. The "stick" is an element of interactivity designed into the ad that requires the consumer to provide a response or otherwise interact with the ad (thus allowing the service to assure the advertiser that the consumer did indeed watch and pay attention).

The present invention also introduces the concept of "negative pricing of information." In today's marketplace, entertainment and information (sometimes generically referred to as "intellectual property") carries a positive price, or is free. "Negatively priced information" pays the consumer for his or her attention. This is a generalization of direct payment for ad viewing, since the information or content need not be an advertisement in the conventional sense. There is a fine line between certain kinds of information and advertising, particularly when an advertising message can be as straightforward as the technical specs of a new car or computer, and an information message or entertainment can change minds and influence people. Negative pricing could work well for information of this type. For example, it could be used as a means of expressing a political viewpoint, raising the priority of an e-mail message, or getting potential employers to read a resume. Negatively-priced information would find its audience through personal profiles of potential consumers on file in the database.

Privacy

In the system provided by the present invention, the link between the ad and the appropriate viewer is provided by reference to a data base of digitally stored electronic demographic profiles of potential viewers. The viewer profiles are to be private, dynamic, and interactive. The system protects member privacy while at the same time maintaining the personal information files that permit specialized targeting of ads.

Many businesses keep profiles of customer interests and transactions. (For example, some supermarkets keep customer profiles via "savings cards" that allow the market to track each person's purchases and tailor individual promotions.) The system provided by the present invention offers several innovative features and applications for such profiles. Profiles can be private (pseudonymous). That is, they can be used and even marketed while protecting the customer's identity. For example, a merchant may be permitted scan a profile to determine his affinity for the customer, but cannot learn the customer's name or address. Contacts between advertisers and consumers can be brokered by a "profile bank" that protects the consumer's privacy.

The demographic profiles can be constructed through interest questionnaires that the consumer completes when subscribing to the service, and also through electronic tracking of his/her usage of the service (and other habits). Thus, the profiles can be dynamic, evolving with the customer's transaction history. A customer can choose to exclude any transaction (e.g., viewing of certain material or purchasing of certain products) from his profile. Profiles can also be interactive in that a customer may edit his profile at any time to add or delete interest features, and to delete any transaction records. Thus, for example, the customer can delete historical transaction entries evidencing her purchase of an "adult" film if desired. Similarly, the customer can change her profile to express interest in seeing certain types of automobile advertisements, and then, after she has selected and purchased a new car, delete those profile entries.

In addition to the viewer profiles, the system provided by the present invention also may keep the contact information of each member confidential. For example, if an advertiser wants a consumer's name and address, he has to offer to buy it, and the consumer has to agree to the price. Furthermore, the consumer can specify that no advertiser can resell his/her name without permission. An offer to buy a consumer's name and address might look like this: "Please accept $2.00 for your name and address so we can send you more info." If the consumer accepts (e.g., by clicking on the associated "CyberCoin"), her name and address (from her personal data) will be forwarded to the advertiser, and $2 will be transferred from the advertiser to the consumer's account.

Another aspect of the present invention provides a two step technique for the development of an accurate consumer profile. First, a consumer is asked to pro-actively describe him or herself. This forms a "base profile." Then the consumer's actions can be monitored in this example such that a representation of the consumer's actions are "overlaid" upon the self description. This combination of self description combined with monitored actions yields highly accurate and granular consumer profile which can be used to predict consumer interests and behaviors. The system also can generate a base profile from historical data as well as self description.

EXAMPLE

To show how the approaches discussed above transform a typical advertising transaction, consider a brief scenario starring "Cynthia," an Internet surfer who has recently signed on to the service provided in accordance with the present invention.

Upon logging on to her customized home page, Cynthia would be presented with a list of ads that she may elect to view. The ads would be preselected for her on the basis of a personal profile questionnaire that she has completed plus automatic tracking of her previous Internet usage. For example, today's list might contain ads for medium-price hotels in Mazatlan (where Cynthia is planning a vacation), a do-it-yourself telescope kit (a possibility for her son's upcoming birthday), San Francisco Forty-Niner football tickets (she's a fan), new nonfat organic dessert items (she's on a diet), and heavy equipment for earth moving (she is part-owner of a construction company). In the system provided by the present invention, not only are the subjects of the ads keyed to Cynthia's interests, but certain aspects of their style, depth, and content can also be customized to her as well. For example, Cynthia's love of sunsets, independent rock groups, and dancing (all available from her profile) can be used to customize ads so that she will enjoy them more. This marks another important change from prior practice in the advertising business.

Next to some of the titles on the ad list displayed to Cynthia is the image of a little gold coin—a "consumer interface button" or "CyberCoin"—with a distinctive style. When Cynthia clicks her mouse on the CyberCoin, it opens up the ad and simultaneously causes a transfer of cash or credit directly to Cynthia's desktop (or to a specialized account, credit card or bank account associated with her). This gives Cynthia an important incentive to watch the ad. The ad can include some degree of interactivity (e.g., Forty-Niners game stadium seating preference, choice of diet dessert, etc.) to allow the service to give the advertiser a guarantee that Cynthia paid attention to the ad. This interactivity can make the ad more fun (e.g., by providing a guessing game, quiz or joke).

The ad might ask Cynthia if she is interested in having the merchant contact her directly, and can include another CyberCoin that compensates Cynthia for the informing the merchant of her identity. Cynthia can be given the choice of whether her identity is to be released—thereby protecting her privacy.

Applications Beyond Advertising

Although the present invention is very useful in purveying advertising, many of its underlying principles can be carried much further, into the realm of any type of valuable information—including for example entertainment and information on the Internet. The present invention is particularly useful with regard to information that "pursues the consumer" rather than waiting to be discovered. In the past, buyers have been the more active party in the entertainment and information marketplace. Sellers publish and advertise their wares, but buyers do the searching. The present invention allows these roles to be reversed. It allows the creators of entertainment and information (writers, film makers, journalists, musicians, graphic artists) or their agents to actively seek out their potential audience, based on the personal profiles on file in the database. As with advertising, such contacts would only take place with the permission of the receiving party.

The following additional features are provided in accordance with the present invention:

Trading Houses

Eventually, advertising, information, and entertainment may all exist amicably side by side in a cyberspace To handle a wide variety of different transactions, the present invention provides a "trading house"—an electronic analog of a stock exchange. This is an on-line trading "floor" where buyers and sellers (or their software agents) can actively find each other and negotiate transactions. Initially, such transactions would probably be handled through a central server facility, but eventually the work could be spread among many local entrepreneurs who would franchise the necessary software and set themselves up as independent agents to service their community and local businesses (akin to the shopping newspapers common in most local communities). Highly targeted, localized, low-volume advertising might enable some small mom-and-pop businesses and specialized low-tech cottage industries—for example, someone who repairs antique violins—to use advertising to reach customers for the first time.

Points of Interest

Various prior art techniques available on the Internet—specifically bookmarks, history tracking in searching, and On Technology's "On Location" product—permit consumers to track back to items of interest. The present invention can provide "points of interest" that establish a mechanism for tracking all consumption and viewing, and keeping indexed content summaries that allow the viewer to conduct free-form searches of the recent past.

Private Home Pages

The World Wide Web allows anyone to maintain public "home pages" that are visible to all, and are accessible to all with optional name-password access restrictions. The system provided by the present invention adds the capability of maintaining private home pages that are accessible and visible only to their owners. Another example feature of these pages is the capability of "dragging and dropping" content between one's private and public home pages.

Pricing

The service provided by the present invention can be offered free to the consumer, with the service operator receiving compensation from advertisers.

BRIEF DESCRIPTION OF THE DRAWINGS

These, as well as other objects and advantages of this invention, will be more completely understood and appreciated by careful study of the following more detailed description of a presently preferred exemplary embodiment of the invention taken in conjunction with the accompanying drawings, of which.

DETAILED DESCRIPTION OF THE DRAWINGS

Figure 1:
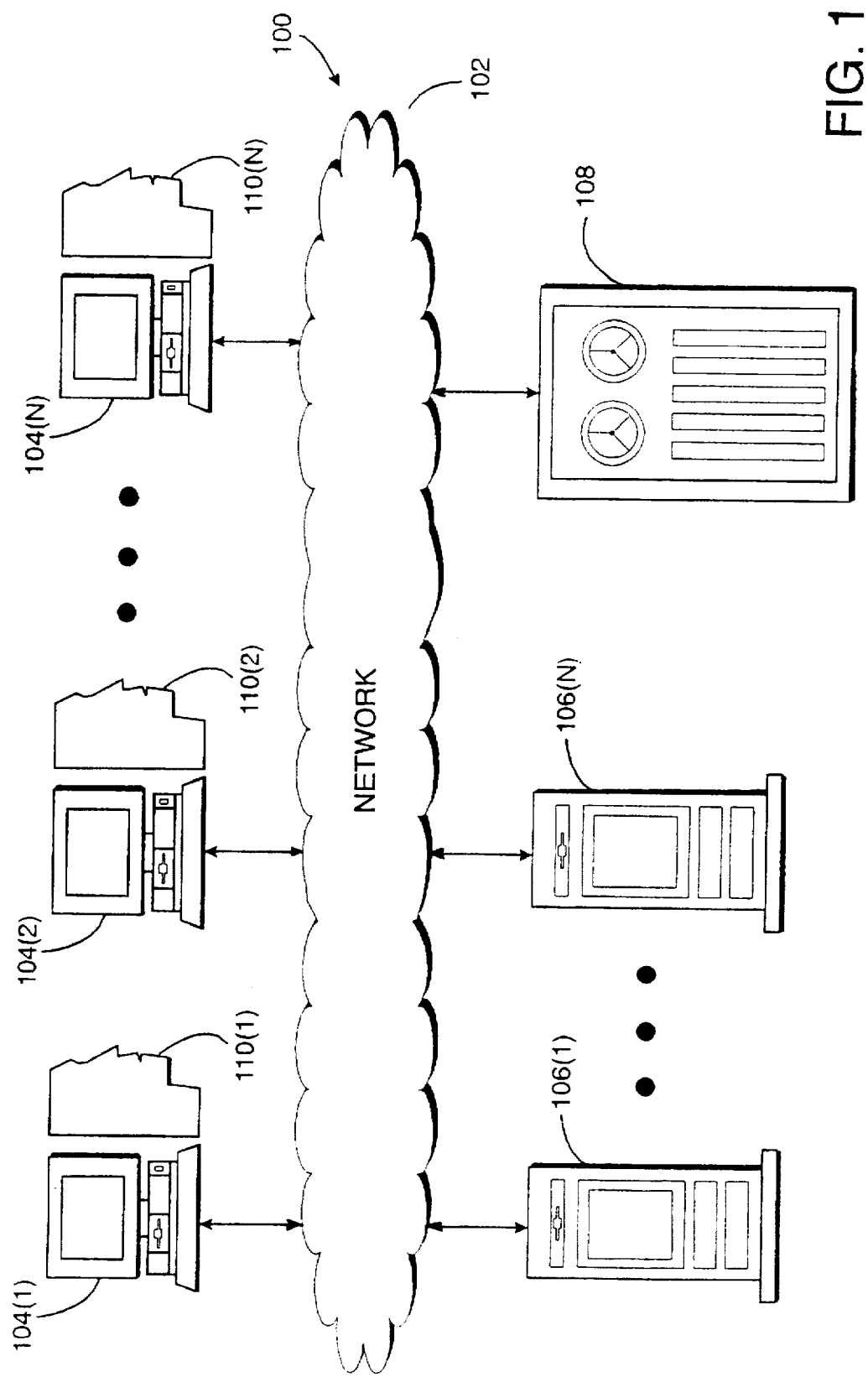
FIG. 1 shows an overall environment 100 in which the present invention may be used.

FIG. 1 shows an example of an overall environment 100 in which the present invention may be used. Environment 100 includes a network 102 such as, for example, the Internet or "Future Net." A plurality of consumer computers 104 are connected to network 102. Also, connected to network 102 are a plurality of information servers 106 and one or more financial clearinghouse computers 108. Network 102 allows each of computers 104, 106 and 108 to communicate with other computers.

Each of consumer computers 104 may be owned and operated by a different consumer. For example, computer 104(1) can be at the home of a first consumer, consumer computer 104(2) can be at the home of a second consumer, and consumer computer 104(N) may be at the home of an Nth consumer. Consumer computers 104 in this example may comprise, as one example, conventional desktop personal computers or workstations having the ability to connect to network 102 and being capable of running customized software supporting the service provided by the present invention.

In this example, each consumer computer 104 may be provided with a software agent 110. Software agents 110 comprise software processes nominally executing on behalf of consumers. These software agents 110 perform tasks at the direction of the consumers who own computers 104. In one embodiment discussed below, software agents 110 can travel from consumer computers 104 to other computers (e.g., servers 106) to retrieve information and bring it back for use by consumer computers 104.

Servers 106 store information and disseminate it to consumer computers 104 over network 102. For example, servers 106 may act as "attention brokers" or "trading houses," and may supply consumer software agent 110 with advertisements or other information to be viewed or reviewed by consumers.

Financial clearinghouse 108 in this example is responsible for supervising and/or performing financial transactions. For example, financial clearinghouse 108 may maintain account or transaction information for each of the consumers operating computers 104, and may be responsible for assuring that consumers pay for some information content delivered to them and are compensated for paying attention to other information content delivered to them.

Figure 2:
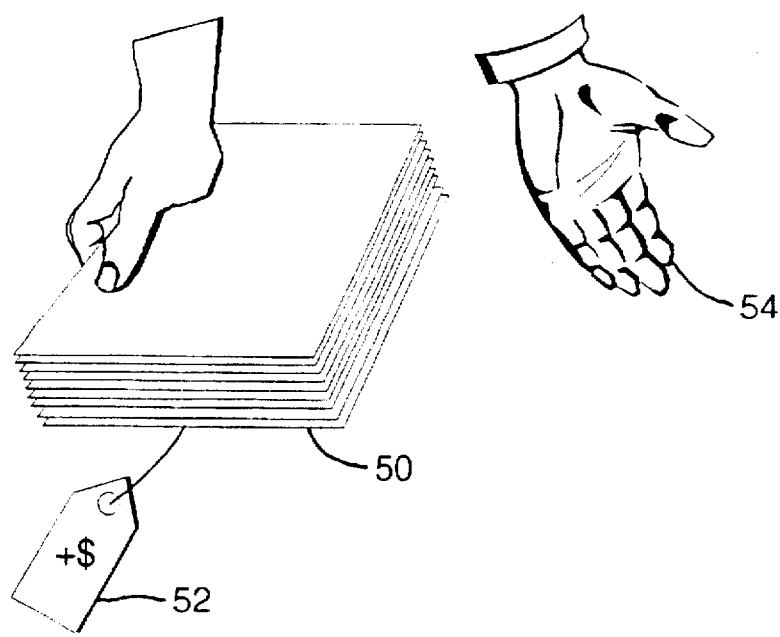
FIG. 2 shows an example of positively priced information.

For example, FIG. 2 schematically shows a transaction involving "positively priced information." Suppose a consumer requests valuable information such as, for example, a television program, prerecorded music, magazine or newspaper articles, or a research report. In this example, consumers may request such information through consumer computers 104, and the information can be delivered to the consumers in digital form via the consumer computers and/or by other means. In this example, the consumers requesting and consuming such information are asked to compensate the providers of such information. FIG. 2 shows an information provider providing valuable information 50 with a "price tag" 52 stating how much the information costs, and requesting compensation in this amount (as signified by the open hand 54). Of course, the physical transaction shown in FIG. 2 is only for purposes of illustration-since in this example the actual transaction takes place electronically. In particular, an electronic "price tag" 52 (i.e., a request for payment) may be presented to the consumer's computer 104. The consumer (or her software agent 110) may satisfy the request for payment by providing an appropriate amount of digital cash and/or by authorizing financial clearinghouse 108 to debit her account in the appropriate amount. Upon receipt of such payment or payment authorization, the information provider may release the valuable information 50 to the consumer (e.g., by transmitting it over network 102 and/or by providing consumer computer 104 with a decryption key or other information needed to release it from an information container or other protected form).

Figure 3:
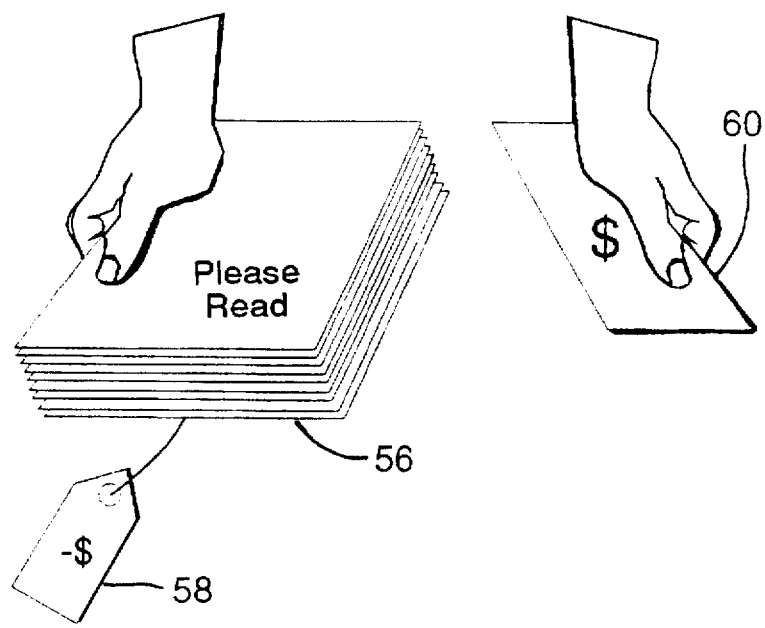
FIG. 3 shows an example of negatively priced information.

FIG. 3 shows an example of "negatively priced information," i.e., information that an advertiser, attention broker or other party will pay a consumer to view and give their attention to. For example, a lingerie company may be willing to pay certain consumers to view its advertisement for a new line of lingerie products. In FIG. 3, the information 56 being provided to the consumer represents an advertisement for other such "negatively priced information." A virtual "price tag" 58 associated with information 56 indicates the amount the information provider will compensate a consumer to pay attention to the information 56. In this example, the consumer uses her computer 104 to read information 56 (and, in some embodiments, to interact with the information thereby evidencing that she has paid attention to it). In response to paying attention to the information 56, the information provider compensates the consumer by providing a payment 60 in the form of digital cash and/or a credit on the consumer's account (as registered by financial clearinghouse 108, for example).

As discussed above, the payment transactions 54, 60 may be handled either through a direct payment of digital cash to/from the consumer's computer 104, through an account debit or credit via financial clearinghouse 108, or through coupons (e.g., a form of cash payment that is restricted in its use). A digital cash transaction at the consumer computer 104 has the advantage of providing an immediate, direct electronic payment. For example, each consumer computer 104 can maintain a repository ("piggy bank") of digital cash. Positively priced information transactions such as those represented in FIG. 2 deplete the digital cash in the repository, and negatively priced information transactions such as shown in FIG. 3 add to the digital cash in the repository. Such direct payment digital cash transactions (or electronic coupon distribution) can be decentralized and require no participation from a central computer such as financial clearinghouse 108.

Figure 4:
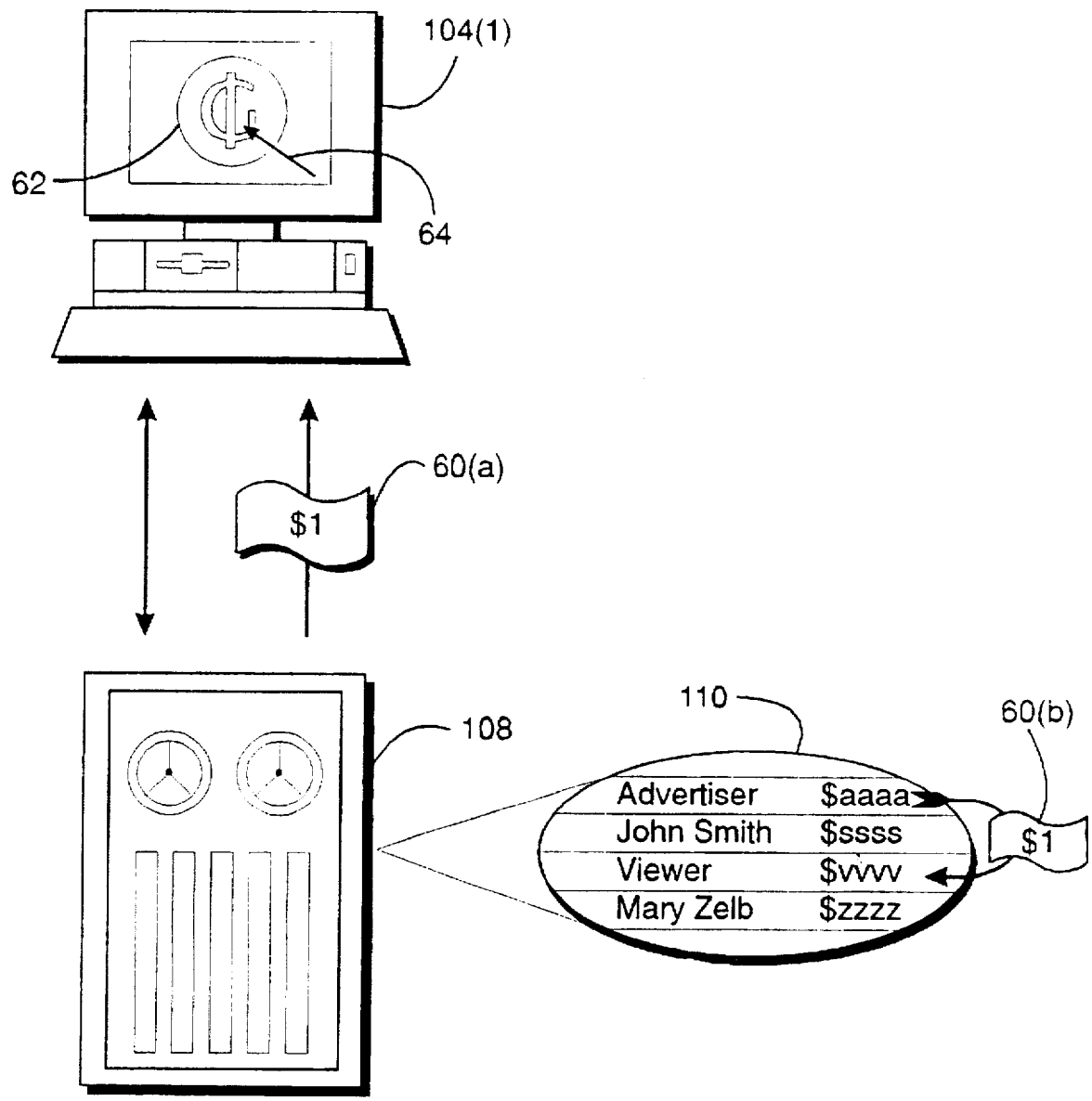
FIG. 4 shows an example of direct payment and financial clearinghouse payment through use of a "CyberCoin" icon.

FIG. 4 shows an example transaction that makes use of financial clearinghouse 108 to transfer a payment 60 from an advertiser to a consumer based on a "negatively priced information" transaction shown in FIG. 3. In this example, an icon 62 of a coin (a "CyberCoin") is displayed on the consumer's computer 104. The CyberCoin 62 represents a payment or other incentive (e.g., a coupon), and encodes a network address of an information provider in this example. The consumer can choose to watch the associated advertisement by moving her cursor onto the CyberCoin icon 62 and clicking her mouse pointing device button (represented by arrow 64). The consumer has an incentive to do this because she knows that this action will transfer compensation or some other incentive represented by the CyberCoin icon 62 to her credit. Clicking on this CyberCoin 62 may institute an automatic retrieval, over network 102, of the ad information the CyberCoin is associated with.

In this example, the compensation (e.g., direct cash payment) represented by a CyberCoin has generic usefulness, but in another example such compensation could have a restricted value analogous to a coupon (which is converted to cash on a one-to-one currency exchange basis but for a limited set of purchases such as purchase of particular specified products).

As mentioned above, one possible payment arrangement is to provide direct payment in the form of digital cash 60(a) to the consumer's computer 104 in response to the consumer's selection of the CyberCoin icon 62 (possibly as a condition on the consumer interacting with the advertisement and answering appropriate questions or providing requested information). Another possibility is for the consumer's computer 104 to interact with financial clearinghouse computer 108 to cause the financial clearinghouse compute to update financial database 110 it maintains so as to debit the advertiser's account and credit the consumer's account by the appropriate payment amount 60(b).

The following informational text may be displayed on the screen of FIG. 4 if desired:

Direct Payment

We allow advertisers to pay directly for your time and attention. If you see a CyberCoin with a value beside it, just click to transfer that value to your own account. (Some ads might ask for your interaction.) Ads that contain CyberCoins are marked with an icon, and the total value of all their coins, on your home page ad list.

We also allow advertisers to offer coupons. Nothing special there, except that these coupons "attract" relevant ads (unless you ask them not to). So you don't have to shop around—the advertisers do the work.

Figure 5:
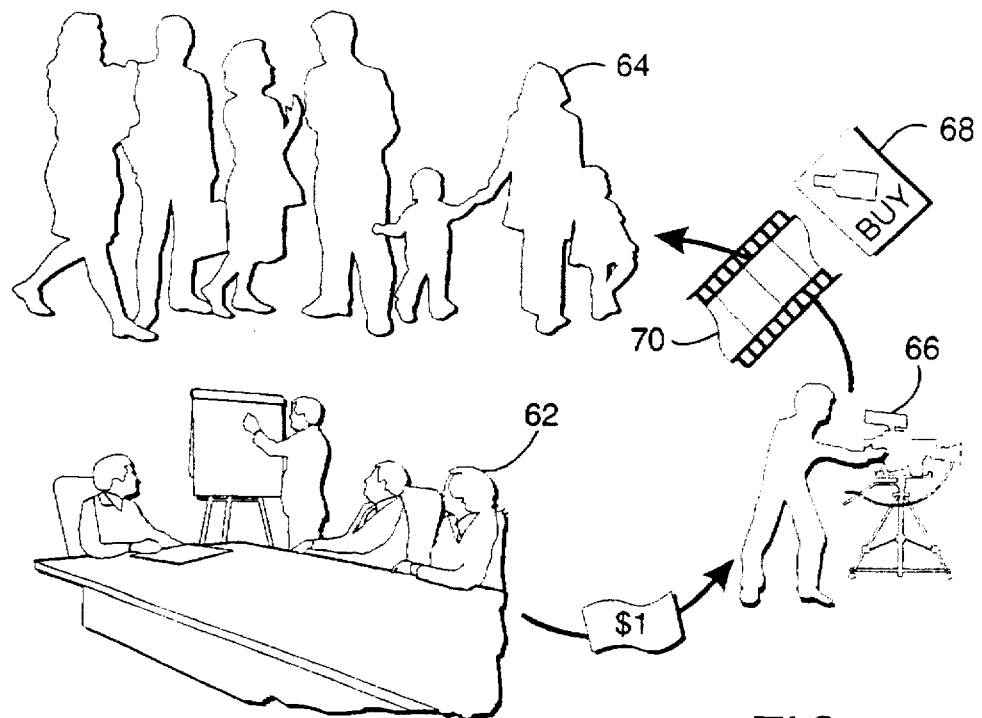
FIG. 5 shows linked sponsorship.
Figure 6:
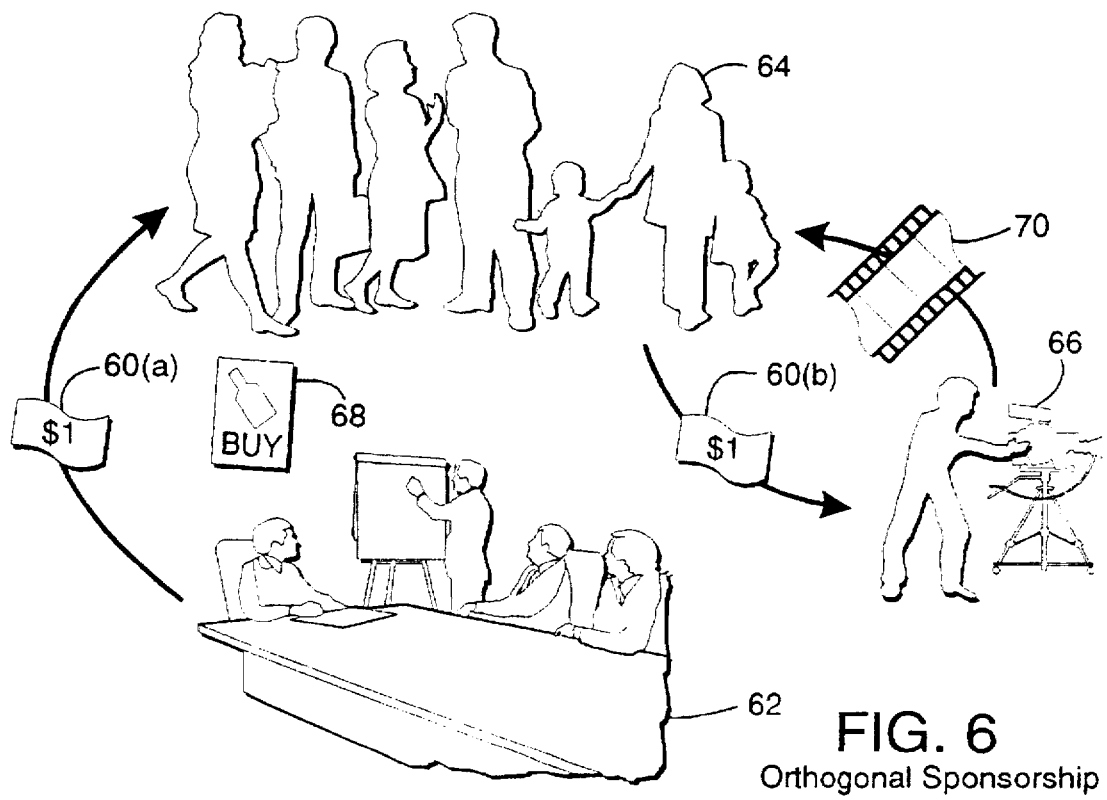
FIG. 6 orthogonal sponsorship.

FIG. 5 illustrates the concept of "linked sponsorship," and FIG. 6 illustrates the concept of "orthogonal sponsorship." As explained above, the "linked sponsorship" model shown in FIG. 5 is the traditional way in which advertisers 62 deliver their ads to consumers 64 via mass media providers 66. In the FIG. 5 model, the advertisers 62 compensate the mass media providers 66 to include advertisements 68 embedded in the entertainment or other content 70 being distributed by mass media to consumers 64. FIG. 6 shows the orthogonal sponsorship model provided in accordance with the present invention. FIG. 6 shows that using orthogonal sponsorship, the information content 70 provided by producer 66 is separated from the advertisements 68 provided by advertisers 62. Advertisers 62 can directly compensate consumers 64 via payment 60(a) for viewing and paying attention to their advertisements 68. Consumers 64 can use this payment 60(a) to compensate information provider 66 via another payment 60(b) for providing entertainment or other information 70 the consumer wishes to access. Sponsorship becomes unlinked from the content of the sponsored entertainment or service 70, much to the benefit of the consumer.

Figure 7:
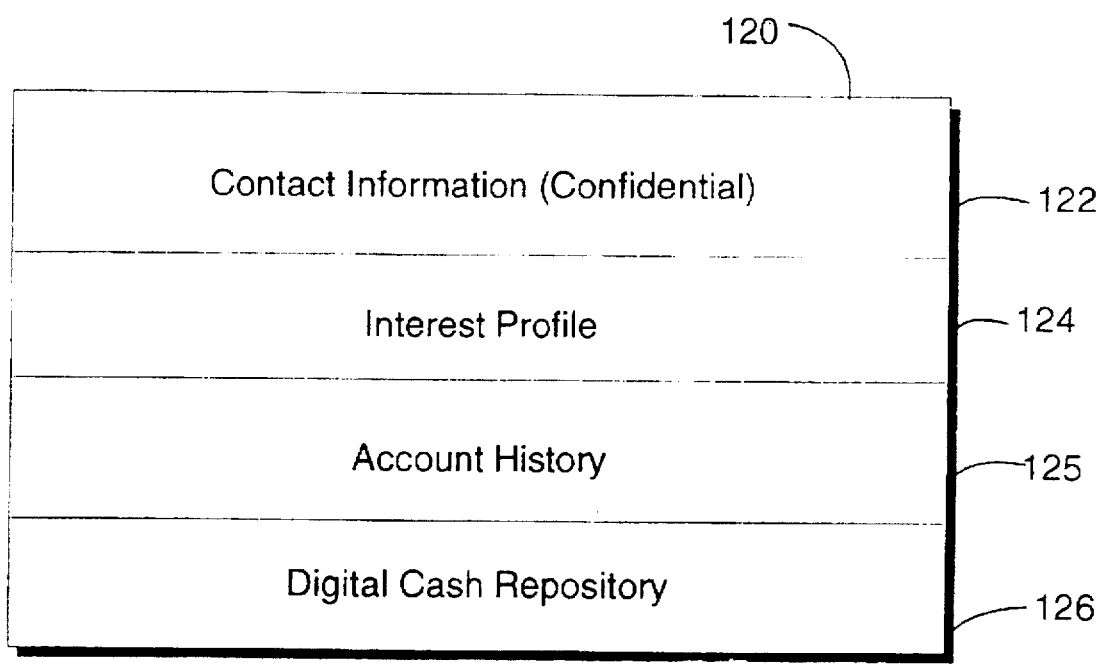
FIG. 7 shows an example consumer database.

As discussed above, the orthogonal sponsorship model shown in FIG. 6 is advantageous because it allows advertisers 62 to more accurately and efficiently target their ads 68 to particular consumers 64 interested in the ads. In this example, system 100 supports such more accurate targeting by providing each consumer 64 with a personalized database 120. An example consumer database is shown in FIG. 7. Database 120 may include contact information 122, interest profile information 124, account history information 125, and a digital cash repository 126. Contact information 122 identifies the consumer 64 so that other computers (e.g., 106, 108) can contact the consumer's computer 104 (or the consumer directly over communications means other than network 102). Consumer interest profile 124 includes demographic and other information detailing the consumer's interests, habits and preferences. This consumer interest profile 124 information can be used by advertisers 62 to target advertisements selectively to certain consumers and not to others (e.g., teenage boys can be sent skateboard ads, mothers can be sent children's clothing ads, retirees can be sent conservative investment information, golfers can be sent golf product ads, etc.). In the case of direct payment using digital cash, consumer database 120 may also include a digital cash repository 126 as discussed above.

In this example, consumer database 120 is a data structure created by consumer's computer 104 when the consumer registers for receiving ads, information and services via system 100. For example, at registration time, the consumer's computer 104 may display a questionnaire and associated information requesting the consumer to provide identity information such as the following:

Personal Data

We keep the contact information of each member confidential. If an advertiser wants your name and address, he has to offer to buy it, and you have to agree to the price. (Furthermore, you can specify that no advertiser can resell your name without your permission.) An offer to buy you name and address might look like this:

Please accept $2.00 for your name and address so we can send you more info.

If you accept by clicking on the coin, your name and address (from your personal data) will be forwarded to the advertiser, and $2 will be transferred from the advertiser to you.

Contact Information—Confidential

We will never release this information. You may chose to release it, however, in response to an advertiser's offer to pay you for your name and address. There is no way that an advertiser can access this information without your case-by-case consent.

Your Name
    First
    Middle

Last
Your Telephone Number
   Please leave a telephone number where we can reach you.
Your Postal Address
   Street Address #1
   Street Address #2
   City
   State or Province
   Zip or Postal Code
   Country
Your Email Handle
   Please choose a "handle" (like a nickname or screen name) for your email account. The conventional choice is your first initial followed immediately by your last name, all in lower case letters. For example, Jane Oakley would use "joakley." I want my handle to be
Your Password
   Please choose a password for your email account. It should be easy to remember, but not something easily guessed. Your password can be between 4 and 16 characters long, with no spaces. The only allowed characters are letters, numbers, and underscores.
   I want my password to be
   This information provided by the consumer is stored in the contact information block 122 of the FIG. 7 database 120. Also at registration time, the consumer may be asked to provide information useful in forming interest profile 124. For example, at registration time, consumer computer 104 may display the following "profile questionnaire" and associated information requesting certain demographic related information from the consumer:

Profiles

We keep a personal profile for each of our members. This is separate from your contact information, but is just as much under your control. Your choose whether or not to make it available to advertisers. You will probably want to make you profile available while keeping your name and address secret. This will allow advertisers to tailor their ads to your interests without invading your privacy.

You can edit and update your profile at any time. In addition, whenever you elect to search for new information, you can choose whether or not to have the search topic included in your profile. (These "anonymous searches" allow you to explore areas of interest that you don't want to include in your general profile.) You can also "rate" the ads that you view, allowing us to fine tune your profile.
Your Profile—Confidential
   We use this information to filter ads according to your interests. We will never release this information without your consent. You will be given a chance (below) to make this profile available to advertisers as a "blind profile," without your name and address. This will allow an advertiser to tailor an ad to your interests without obtaining your identity.
Your Gender
   Female
   Male
Your Birth date
   (Please enter your Birth date in MM-DD-YY format, e.g., 08-29-71)
Ethnicity
   (e.g., African-American, Asian, Hispanic, White, etc.)
   Your ethnicity is
Religion
   Your religion is
Your interests
   List your interests here. We will use this information to filter your ads. It helps to restrict your list to simple nouns or phrases, rather than sentences. For example:
Profile Availability
   Your profile does NOT include your contact information. If you leave it available to advertisers (the default), you are still "anonymous," but advertisers can tailor their ads to your interests. If you hide your profile, we can still filter your ads, but the ads may be "generic" and less interesting, and they may pay you less money.
   Hide my Profile from advertisers
   As described above, the contact information 122 and the interest profile 124 may be used separately in this example. For example, if the consumer 64 consents, system 100 can release the consumer's interest profile 124 but not the user's contact information 122 to advertisers 62. This "blind profile" 124 can be used by advertisers 62 to target their ads 68.

Figure 8:
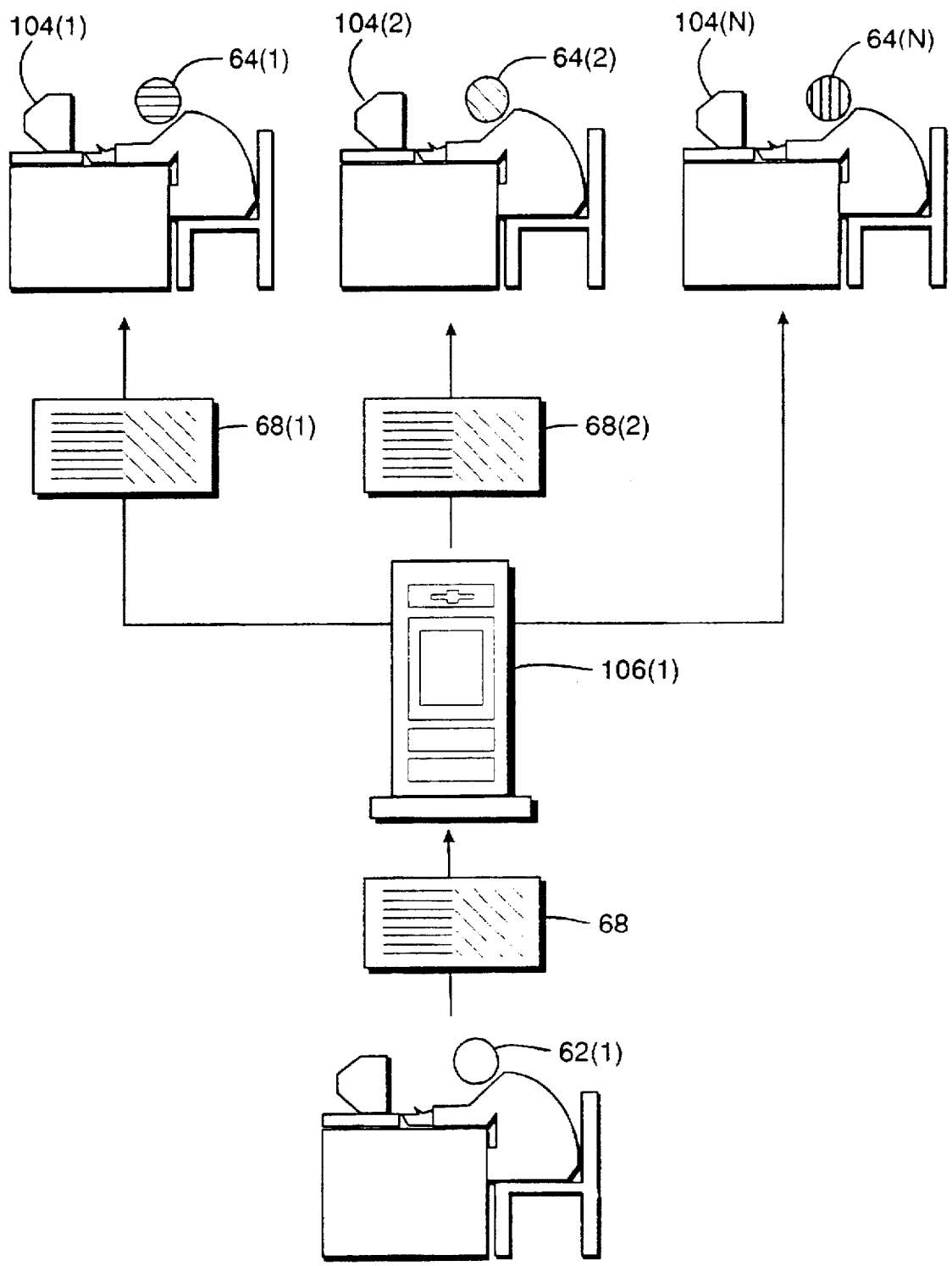
FIG. 8 shows an example of demographic routing.
Figure 9:
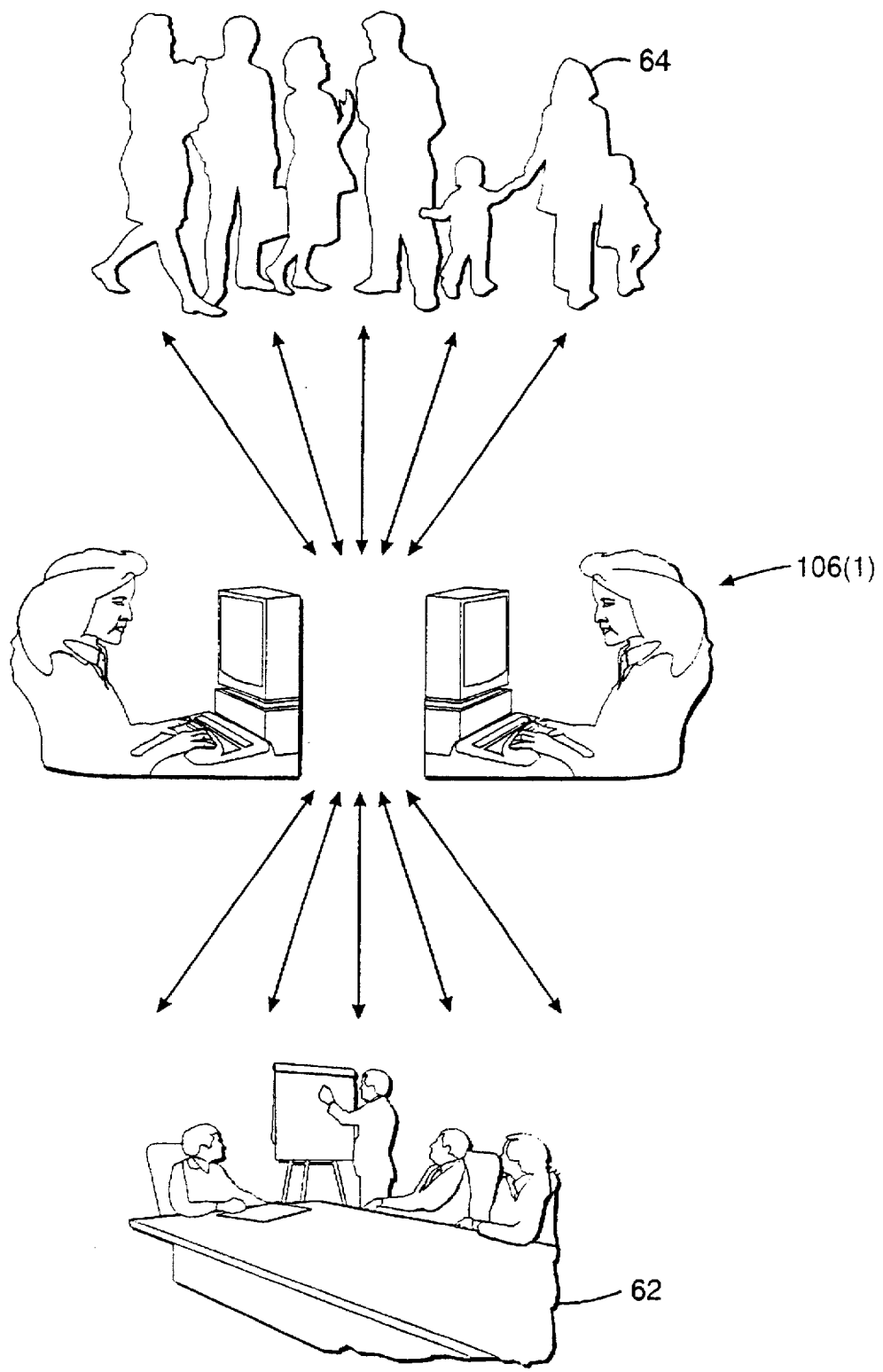
FIG. 9 shows an example of how attention broker servers can be used to broker the attention commodities of consumers.

FIG. 8 shows an example of the use of consumer interest profile 124 to target advertisements 68. In this example, an advertiser 62(1) creates an ad 68 that appeals to certain consumers 64 but not others. In this schematic illustration, ad 68 created by advertiser 62 appeals primarily to consumers having certain preferences (these preferences indicated by the diamond shapes and the slanted stripes). Advertiser 62 provides ad 68 to server computer 106 which acts as an attention broker. Basically, attention broker computer 106(1) is an intermediary between consumers 64 and advertisers 62, and performs the function of routing ads 68 to appropriate consumers 64 based on consumers' interest profile 124 (see FIG. 9). In this FIG. 8 example, attention broker computer 106 may store a copy of the current interest profile 124 and associated contact information 122 for each of consumers 64. However, attention broker computer 106 may not be authorized by any of consumers 64 to release the consumers' information to advertiser 62. Instead, advertiser 62 specifies to attention broker 106 the demographics of consumers 64 to whom the advertiser wants the ad 68 shown. Server 106 may compare this advertiser-specified demographic information with the interest profile 124 of each of consumers 64, and may route the ad 68 to only those consumers (e.g., 64(1), 64(2), but not 64(N)) whose profiles 124 match the demographics specified by advertiser 62.

In this example, the consumer interest profiles 124 may be stored at consumer computers 104 and/or at attention brokerage servers 106. In either case, the consumer's interests are represented by one or more software agents 110 that stand in for the consumer even when the consumer's computer 104 is turned off. These software agents 110 can "live" anywhere in system 100. The function of software agent 110 is to screen or filter ads 68 (or other forms of information that may be competing for the attention of consumers 64) against the consumer interest profiles 124. Matches that achieve a certain threshold of interest (e.g., as adjustable by the consumer who "owns" the profile) represented in the form of "agent reports" that consist of short summaries and pointers to the information. The following informational text may be displayed to a consumer of system 100 concerning agents:

Interest Agents

Interest is still any advertiser's primary tool for grabbing attention. When you sign up with us and fill in your profile, we build a personal agent for you. This agent works around the clock, searching out and screening new ads to find ones that match your interests. The next time you log in, these ads are waiting for you. If your agent ever finds an ad you don't like, it takes your feedback and modifies its behavior accordingly. There's no reason to put up with ads that don't interest you.

You can also initiate "search requests" to satisfy spur-of-the-moment interests. By default we will give this task to your personal agent, and this new interest will become part of your profile. But you can also request that the search be carried out by a new "secret agent" that won't affect your profile.

We also provide a third kind of agent—the salesman. This is an agent that works on behalf of an ad itself, searching out interested viewers and bringing it to their attention. But unlike a real-world salesman, the cybernetic version can't come calling unannounced and unwelcome. Your personal agent has priority, and has to approve the ad first.

So while big-budget advertisers can use CyberCoins to widen their circle of interest, small-budget advertisers can rely on their salesmen to reach their natural audience of most-interested parties.

Figure 10:
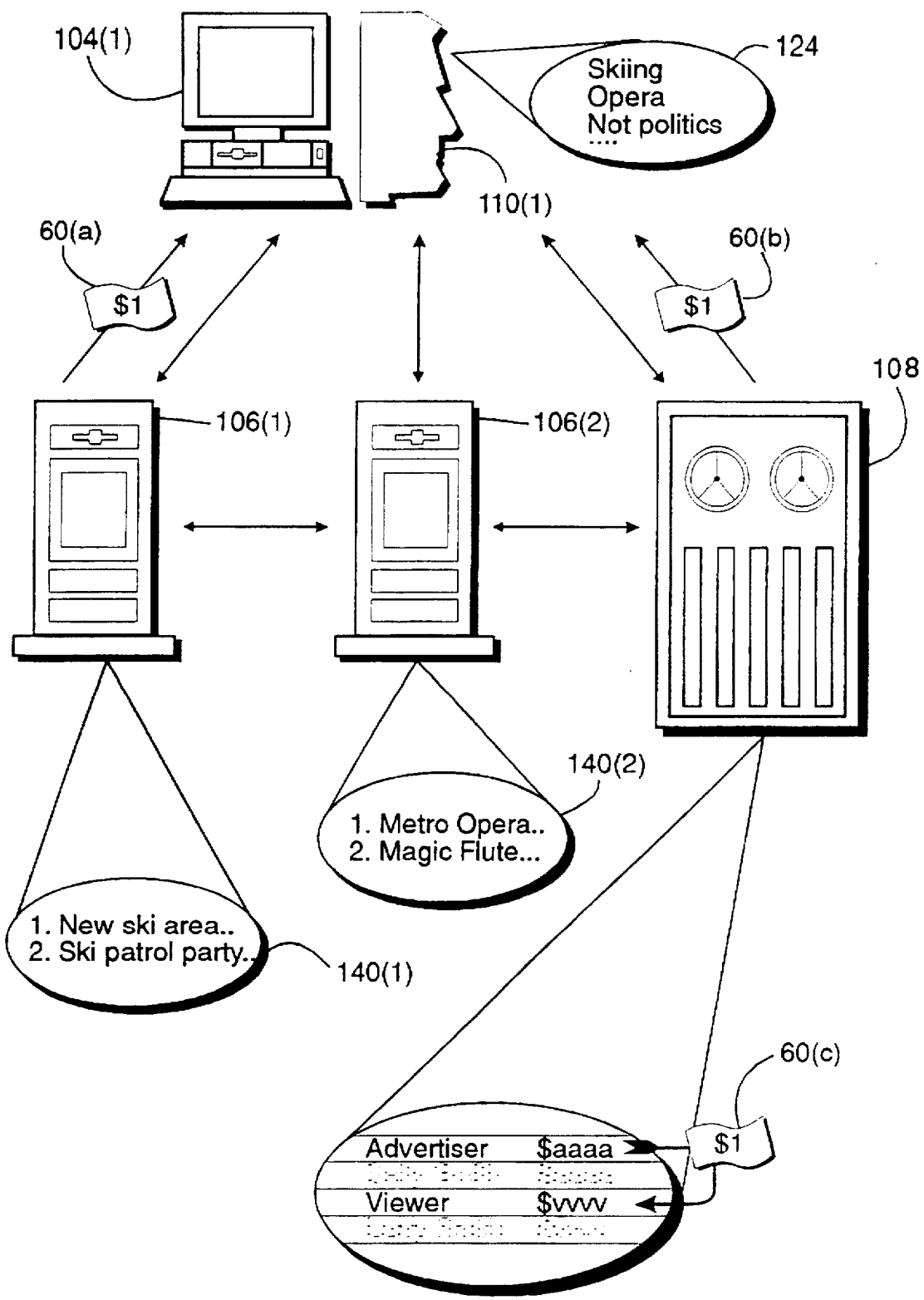
FIG. 10 shows an example of attention brokering.

There can be many attention brokerage servers 106. Each attention brokerage server may serve a specific interest area (e.g., opera, winter sports, etc.), a specific geographic area, a specific demographic area, or any combination of these. FIG. 10 shows an example arrangement including two attention brokerage servers 106(1), 106(2). Attention brokerage server 106(1) may broker advertising and other information relating to winter sports in general or skiing in particular. Thus, attention brokerage server 106(1) in this example stores a repertoire of ads (or other information) 140(1) relating to skiing. The objective of server 106(1) is to deliver these skiing ads 140(1) to the computers 104 of consumers who are, based on their consumer interest profiles 124, interested or likely to be interested in skiing ads.

Matching of interest profiles 124 with ads can be performed using "relevance indexing" based on hierarchical tree structures. For example, suppose, the user likes Thelonius Monk, jazz trios, and popular vocal music. The ad or other information relates to Shirley Horn's album You Won't Forget Me. The matching algorithm picks up a mild relevance from the fact that this is jazz piano music (even though it isn't Monk), and a strong relevance from the fact that it is popular female vocal music. The algorithm only has to look up and down the branches of the tree that contain index points. The tree itself can be dynamically maintained: a node that is over-populated with index points can be subdivided, while a node that is sparsely populated can be merged with its parent. A child node is only required to represent a subset of the parent—it is not required to be disjoint from a sibling.

The other attention brokerage server 106(2) shown in FIG. 10 stores ads 140(2) relating to opera, and has the objective of delivering these ads to opera loving consumers. The example consumer compute 104(1) shown in FIG. 10 stores a consumer interest profile 124 that specifies skiing and opera as interest areas. In this example, the software agent 110(1) associated with consumer's computer 104(1) may travel across network 102 to visit each of attention brokerage servers 106.

Agent 110 may present the user's interest profile 124 to attention brokerage servers 106 so as to allow the servers to attempt to match ads within their repertoires 140 with the consumer's interest profile, or in another embodiment, the software agent 110 may maintain the interest profile 124 as confidential and perform the matching itself based on ad profile criteria presented by the attention brokerage servers 106. When matches are found, the attention brokerage servers 106 may deliver the matching ads to the consumer's computer 104, or agent 110 may retrieve the ads. Alternatively, the software agent 110 may retrieve a "thumbnail" brief summary of the ads and display them on the consumer's computer display (see FIG. 11). In this example, each "thumbnail description" of an ad can be displayed by consumer computer 104 with an associated CyberCoin icon 62.

As explained in connection with FIG. 4, when a consumer "clicks" on the associated CyberCoin icon 62, this may initiate retrieval of the associated advertisement described in the "thumbnail description" and display of the advertisement on the consumer's computer 104. The advertisement display may ask the consumer questions or otherwise require consumer interaction to ensure the consumer has paid attention to the advertisement. Upon successful completion of this process, an amount of digital currency may be deposited into the consumer's digital cash repository 126, or alternatively, the consumer's account may be credited and the advertiser's account debited by financial clearinghouse computer 108.

Figure 11:
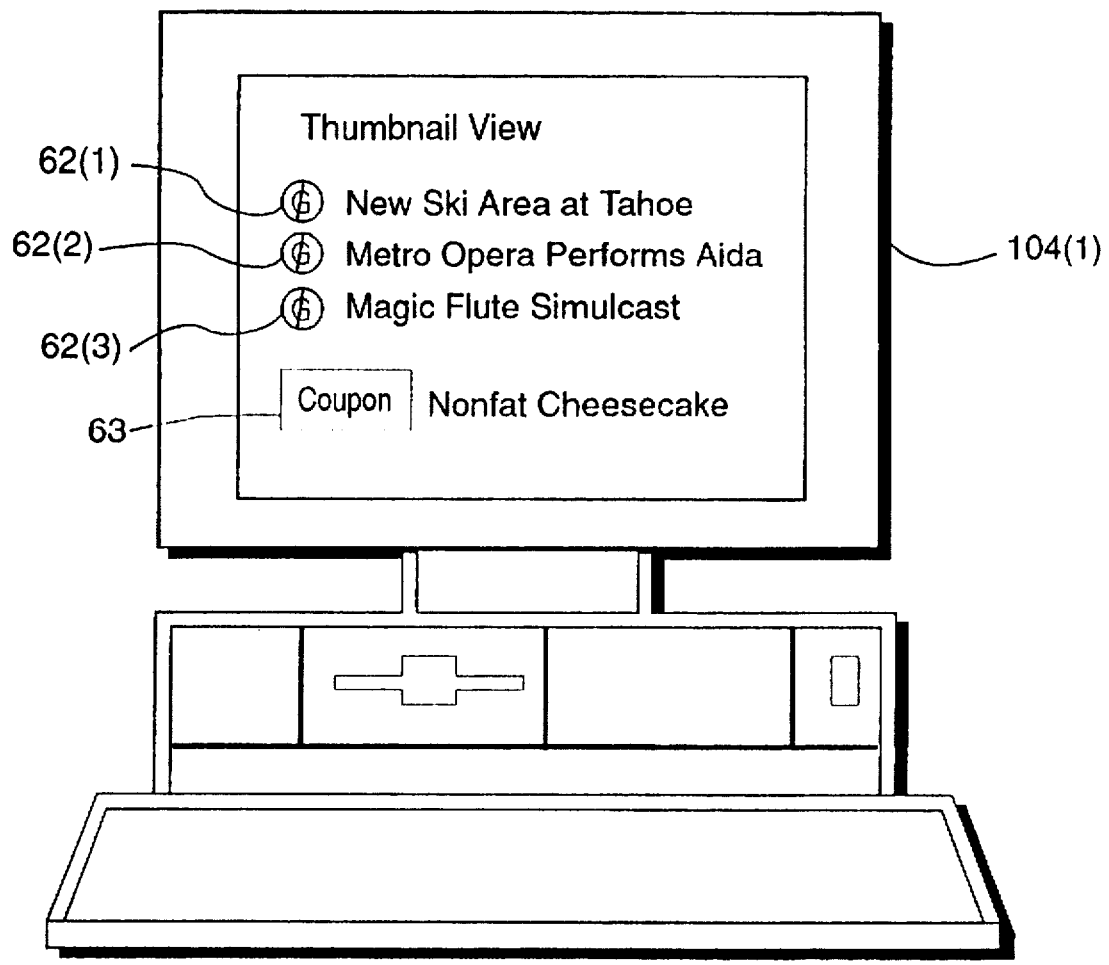
FIG. 11 shows an example consumer display.
Figure 11A:
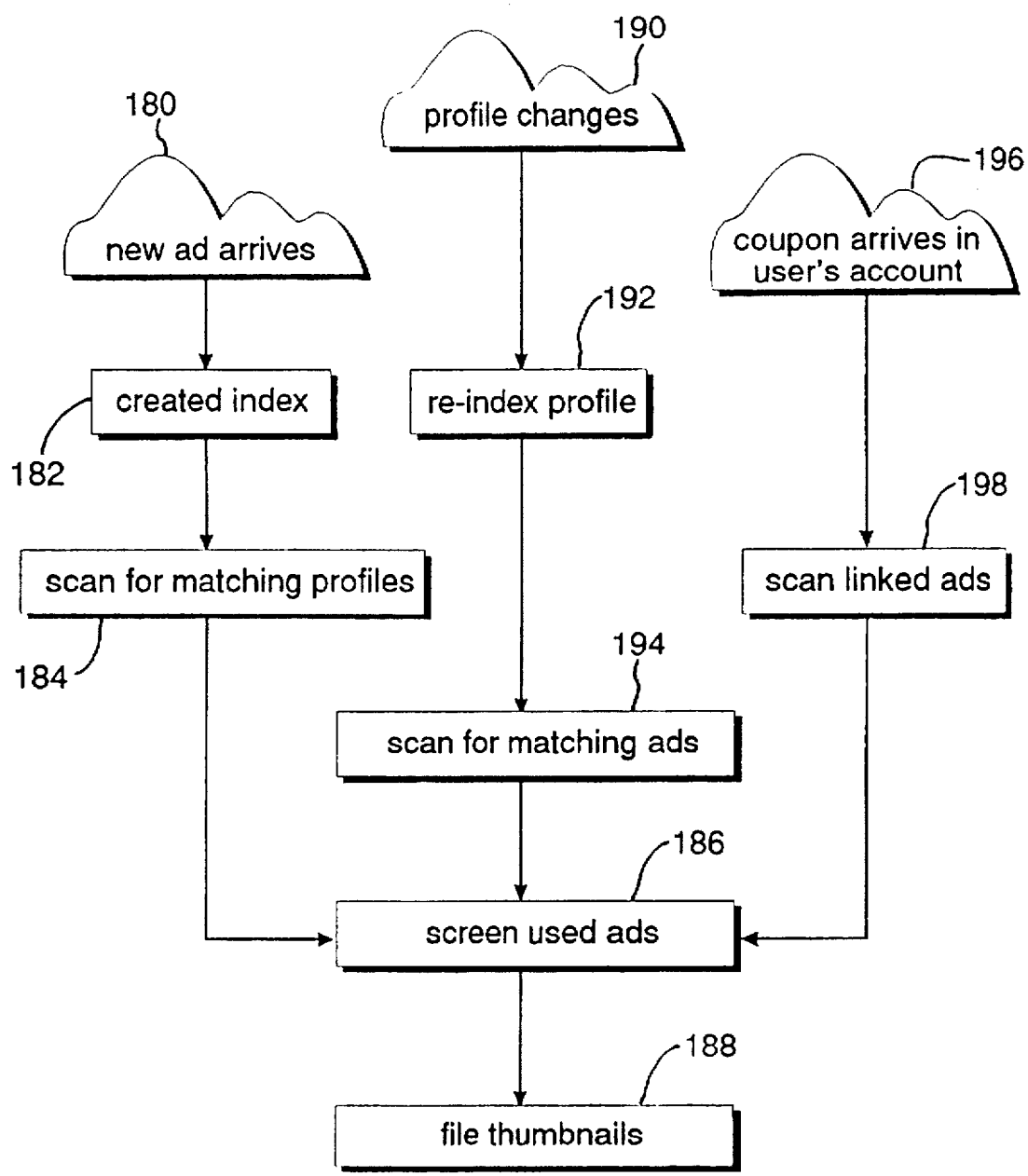
FIG. 11A shows example functions performed by a software agent.

FIG. 11A shows an example process performed by the consumer's software agent 110 to create the screen shown in FIG. 11. Each time a new advertisement arrives at attention brokerage server 106 (FIG. 11A, block 180), the attention brokerage server creates an index of the ad and files it for presentation to software agents 110 (FIG. 11A, block 182). When the software agent arrives at the attention brokerage server 106, it scans the ad index maintained by the attention brokerage server to look for matches between its consumer's interest profile 124 and indexed demographic information corresponding to the ads maintained by the attention brokerage server (FIG. 11A, block 184). The software agent 110 and/or the attention brokerage server 106 may remove from the list of matches all ads that the consumer has already viewed (or has viewed within a particular time frame) (FIG. 11A, block 186). The software agent 110 may then return to the consumer's computer 104 with a file of thumbnail descriptions of each matching ad (FIG. 11A, block 188). The software agent 110 may display the contents of this thumbnail file on the consumer's computer 104 along with CyberCoin icons 62. Selecting the associated CyberCoin icon 62 initiates an interaction between the consumer's computer 104 and the attention brokerage server 106 that stores the matching ad (see below).

Figure 12:
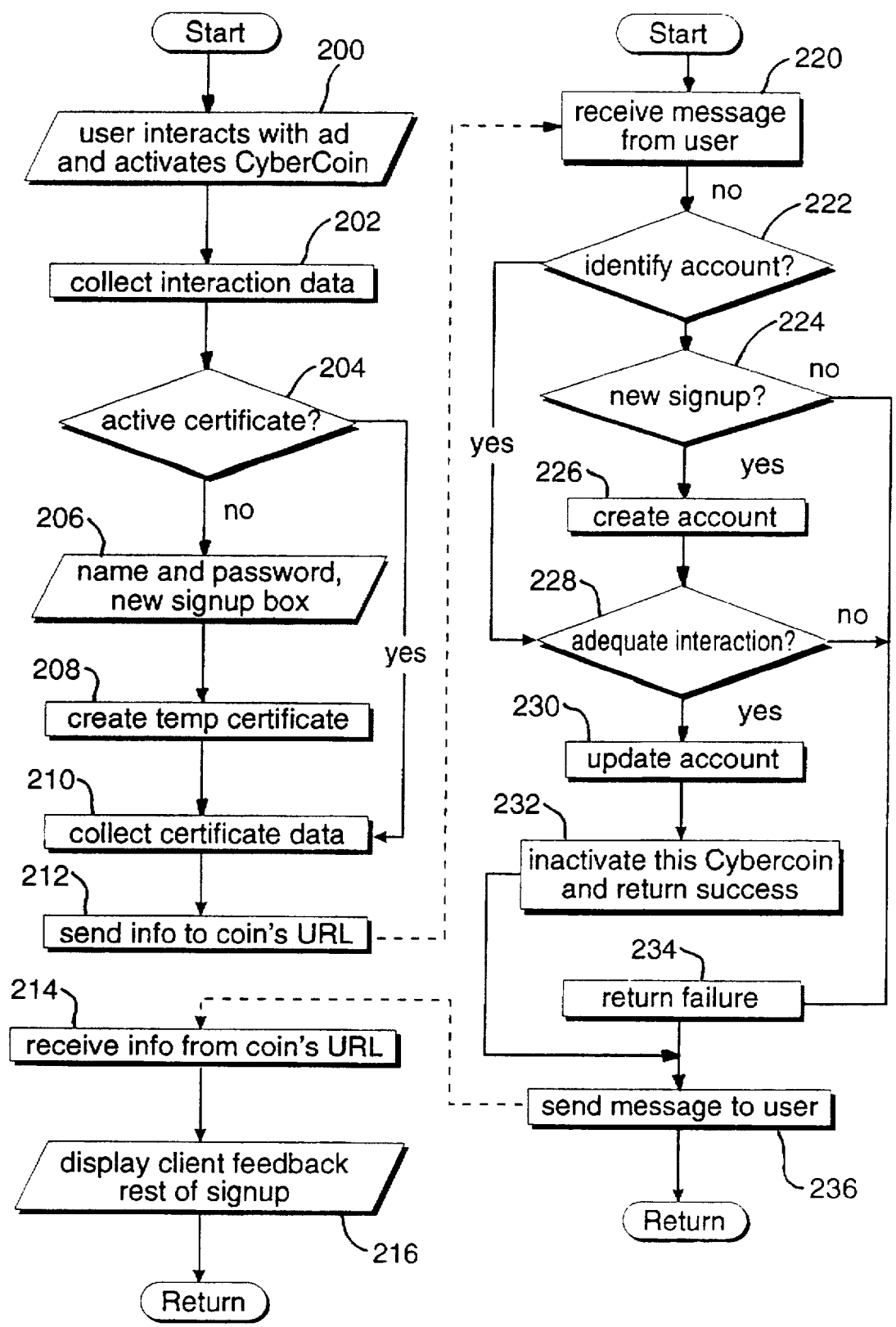
FIG. 12 shows an example overall process performed by a consumer computer and an attention broker server.

FIG. 12 shows an overall example process performed by an interaction between an attention brokerage server 106 and a consumer computer 104. As shown in FIG. 12, a consumer may interact with an advertisement and an associated CyberCoin 62 as discussed above (FIG. 12, block 200). A software process running on consumer's computer 104 collects interaction data (FIG. 12, block 202), and then determines whether the consumer's computer 104 (software agent 110) has an active certificate (FIG. 12, decision block 204). In this example, all registered consumers are provided with a digital certificate identifying them. If the consumer has not yet registered, she will not have an active certificate ("no" exit to decision block 204, FIG. 12), and may be asked to go through a quick sign-up procedure at this time (e.g., to obtain the consumer's name and password) and to create a temporary certificate (blocks 206, 208, FIG. 12). The process next collects the certificate data (block 210, FIG. 12), and sends the certificate data and the collected interaction data to a network destination (universal resource locator (URL) address) specified by the activated CyberCoin 62 (FIG. 12, block 212). The process executing on the consumer's compute 104 may then wait for a response, or may perform other, unrelated activities.

Upon receiving the information from the consumer (FIG. 12, block 220), the software process executing on the attention brokerage server 106 designated by the CyberCoin 62 activated by the consumer uses the certificate data transmitted by block 210, 212, to identify the consumer's account (FIG. 12, decision block 222). If no account exists, the attention brokerage server 106 determines whether the consumer is a new sign-up, or whether the consumer's account has been closed due to some problem (FIG. 12, decision block 224). Since new sign-ups are encouraged, the attention brokerage server 106 creates a new account automatically for new sign-ups (FIG. 12, block 226) and may display the following example server as a precursor to the sign-up process:

A new approach to Internet advertising based on four principles

Attention

Your attention is a valuable commodity. We allow advertisers to pay you directly for your time and attention.

Interest

Interest is still the primary tool for holding attention. We provide agents that filter ads according to your interests, and agents that help ads find you.

Privacy

Your personal data is your private property, and your profile is valuable.

We allow you to control them and their economic benefits, and allow advertisers to pay you for access.

Sponsorship

On TV and in print, advertisers sponsor products. On the Internet, advertisers can now sponsor you. Sponsorship flows through you to the services of your choice. There is no need to link advertising to entertainment content.

Sign up now. It's Free!

Attention brokerage server 106 then determines, based on the interaction data collected by block 202 and transmitted by block 212, whether the user's interaction with the advertisement was adequate (FIG. 12, decision block 228). The adequacy of interaction may depend on particular requirements associated with the ad. For example, some advertisers may not require interaction, while other advertisers may require detailed interaction evidencing that the consumer has paid attention to the ad. If interaction was inadequate ("no" exit to FIG. 12, decision block 228), or if the consumer's account is "bad" ("no" exit to FIG. 12, decision block 224), then the process returns with a failure code (block 234). On the other hand, if the consumer did everything correctly, the attention brokerage server 106 updates the consumer's account to credit (or direct pay) the consumer the monetary value represented by the activated CyberCoin 62 (FIG. 12, block 230), updates its database to inactivate this particular CyberCoin (to prevent the consumer from receiving additional compensation by merely successively repeating the same process for the same ad) (FIG. 12, block 232), and returns with a success code. The attention brokerage server 106 then sends a message to the consumer's computer (FIG. 12, block 236) indicating success or failure, which message is carried by network 102 and received by the consumer's computer 104 (FIG. 12, block 214). The consumer's computer 104 may display feedback (e.g. the sound of a coin falling into a piggy bank for a successful transaction) (FIG. 12, block 216). If the consumer had not previously been registered, the process may request additional information from the consumer to complete the sign-up process (FIG. 12, block 216).

Referring once again to FIG. 11A, the consumer's software agent 110 may also, if desired, initiate the above-described matching process whenever the consumer's interest profile 124 changes (FIG. 11A, block 190). In this example, system 100 will track the consumer's activities and elaborate the consumer's profile 124 automatically. In addition, system 100 in this example permits the consumer to view and edit a plain-language representation of her profile 124 at any time, and add anything to it or delete anything from it. Thus, for example, if the consumer begins looking for a new car, she may edit her profile 124 to add an interest about certain types or categories of automobiles. Such a change in the consumer's profile 124 may cause software agent to re-index the consumer's profile 124 (FIG. 1A, block 192) and a new scan for matching ads (FIG. 11A, block 194).

Referring once again to FIG. 11, software agent 110 in this example may display "coupons" in addition to Cyber-Coins 62 a coupon 63 can be used to start a self-executing process to bring ads to consumers A coupon 63 bypasses the profile matching process described above, by allowing the consumer to directly express a desire to receive information about a certain product or service (or a certain class of products or services). For example, if the consumer "clips" a coupon directed to non-fat desserts, the consumer's software agent 110 will automatically search for ads that are associated with that coupon and retrieve thumbnail descriptions of all such ads (FIG. 11A, blocks 196, 198). Such coupons may be issued by particular manufacturers of goods or services, or they may be more generic and directed to ranges or classes of goods or services. In this example, a coupon icon 63 is displayed on the consumer's compute 104 to indicate the coupon is active, and associated thumbnail descriptions retrieved by the software agent 110 are displayed adjacent the coupon icon (as shown in FIG. 11). The consumer may view the associated ad by simply clicking on the coupon icon 63.

Figure 13:
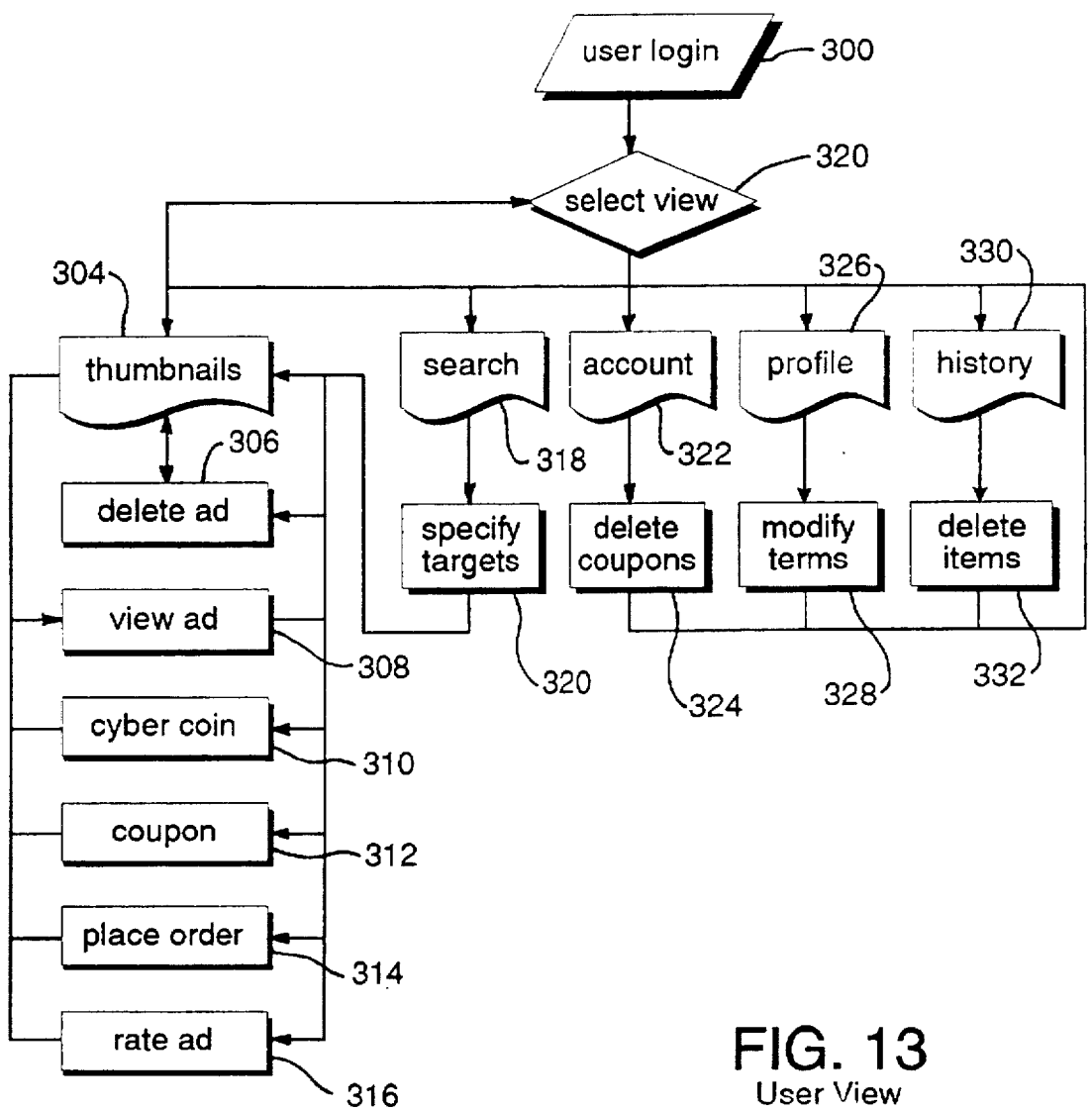
FIG. 13 shows an example consumer computer interface.

FIG. 12 shows the example software control steps that the consumer may select and initiate (e.g., through Windows or other menu-driven operations) on her computer 104 to interact with system 100. In this example, the consumer may log in (FIG. 13, block 300) and then select one of several different views (FIG. 13, decision block 302). In this example, five different "views" are provided:

thumbnails search set-up examine account change profile look at past history.

If the consumer selects the "thumbnail" view, an associated screen is displayed (FIG. 13, block 304) that may be similar to the one shown in FIG. 11. The consumer may delete displayed ads (FIG. 13, block 306), or she may view displayed ads (e.g., by selecting displayed CyberCoins 62 or coupons 63 (FIG. 13, blocks 308, 310, 312). The consumer may also place an order for specific goods or services (e.g., in response to some displayed ads or interaction with them) (FIG. 13, block 314). The consumer may also rate a displayed ad (FIG. 13, block 316) to provide the advertiser with feedback such as "I like the ad" or "I don't like the ad." This feedback can be used to fine-tune the consumer's interest profile 124.

A "search" facility screen (FIG. 13, block 318) may allow the consumer to search through a long list of thumbnail descriptions to find specific ones of interest. The consumer may specify targets (e.g., look at all car ads) in order to select subset of available descriptions for display (FIG. 13, block 320).

If the consumer selects the profile edit screen (FIG. 13, block 326), consumer computer 104 displays a plain-text representation of the consumer's interest profile 124 and allows the consumer to edit the profile, add or delete items (FIG. 13, block 328).

In this example, the consumer is permitted to review her account information 125 by calling up an account review screen (FIG. 13, block 322). The consumer may delete coupons 63 so that the system 100 stops automatically retrieving ads linked to coupons (FIG. 13, block 324).

If the consumer selects the history option (FIG. 13, block 330), the consumer's compute 104 displays the contents of account history 125 and permits the consumer to delete items (FIG. 13, block 332).

If the consumer selects the account option (FIG. 13, block 322), the consumer's computer 104 may display account information (e.g., the balance stored in digital cash repository 126), and may also permit the consumer to delete coupons 63 she is no longer interested in (FIG. 13, block 324).

Trading Houses

As discussed above, an attention brokerage may primarily handle the targeting of positively and negatively priced information. A trading house is a generalization of this. It takes the "stock exchange" or "commodity exchange" concept and extends it to include the buying and selling of arbitrary goods and services (including information) over an electronic network 102. The trading house concept generalizes in at least two areas, the attention brokerage functions described above. First, the consumer's software agent 110 may carry not only the consumer's interest profile 124, but also specific search buy/sell instructions issued by the consumer. Secondly, the purveyors of items and information for "sale" can also be represented by software agents (called "salesmen") that actively seek out interested buyers. Both salesmen and consumer agents may use the same underlying interest matching technology.

Figure 14:
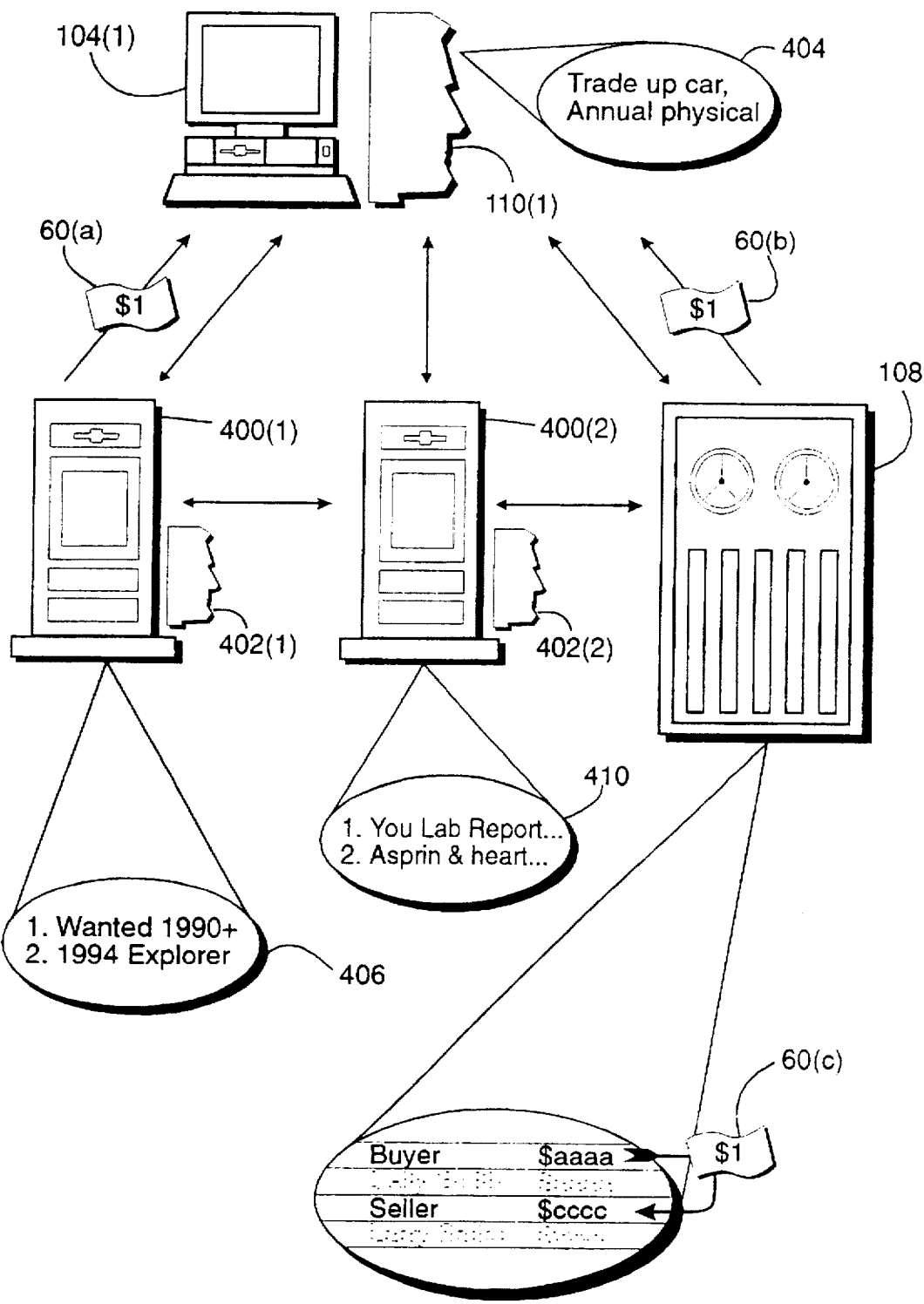
FIG. 14 shows an example of trading houses.

FIG. 14 shows an example embodiment of system 100 including trading houses 400 (which, like the attention broker discussed above, are implemented using standard compute network servers). In this example, each trading house computer 400 executes a "salesman" software agent 402. The objective of software agents 402 is to sell information to willing buyers (i.e., consumer software agents 110). In this example, the consumer has programmed her software agent 110 to seek out and collect information concerning certain types of cars, and to obtain medical information based on the consumer's most recent medical examination. The consumer's software agent 110 stores these instructions 404, and brings them to each of trading houses 400 to determine whether the trading houses have any information that matches the instructions. In this example, trading house 400(1) may be an automotive trading house that markets cars. When the consumer's software agent 110 visits trading house 400(1), the instructions issued to the consumer's agent may be compared with information or items available from the trading house 400(1) (e.g., offers to sell certain kinds of automobiles, represented by database or report 406). The consumer's agent 110 may return to consumer compute 104 with the reported results of the matching process so that the consumer may review the report and take further action (e.g., contact directly the individuals who are selling the automobiles). The automotive trading house 400(1) may charge the consumer for this service, which charges may be satisfied through direct digital cash payment from the consumer's digital cash repository 126 and/or by debiting the consumer's account and crediting the seller's account via financial clearinghouse computer 108. This same mechanism may be used to buy and sell any other type of valuable information (e.g., medical reports 410 that are "sold" by medical trading house 400(2)). Thus, the consumer may empower her software agent 110 to retrieve thumbnail descriptions or other indicia about some items for sale, and may empower her agent to actually consummate transactions according to criteria specified by the consumer (e.g., don't pay more than X dollars).

Figure 15:
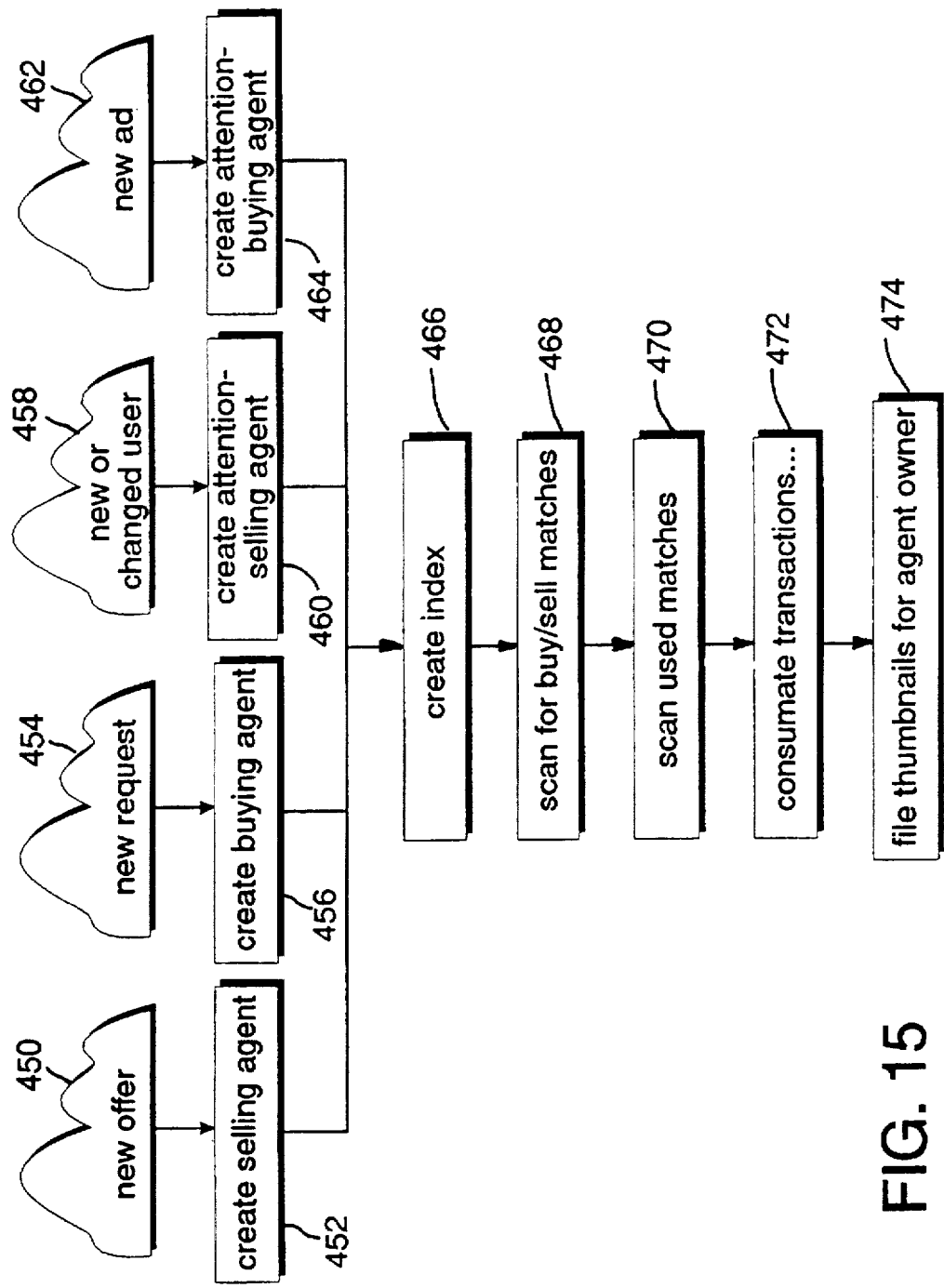
FIG. 15 shows an example of operations performed by a trading house agent.

FIG. 15 is an example of an overall process performed by system 100 to manage trading house agents. If someone wants to make a new offer to sell something (FIG. 15, block 450), system 100 can create an associated selling agent 402 (FIG. 15, block 452). Similarly, a new request to purchase an item (FIG. 15, block 454) may result in creation of a buying agent 110 (FIG. 15, block 456). The above-described processes may exist concurrently with the agent functions described above in connection with attention brokering-which result in the creation of agents to "buy" or "sell" consumer attention as a commodity (FIG. 15, blocks 458, 460, 462, 464). The trading houses 400 may then create one or more indexes of items being bought and sold (FIG. 15, block 466). When a buying agent 110 and a selling agent 402 meet at a trading house computer 400, the trading house computer scans for buy/sell matches (FIG. 15, block 468), and may screen out all matches that have already been previously provided to that particular prospective buyer and/or seller to avoid duplications (FIG. 15, block 470). If the agents are empowered to consummate transactions, then the trading house computer 400 may consummate a transaction and arrange for the appropriate funds to be transferred either directly or via financial clearinghouse 109 (FIG. 15, block 472). The trading house computer 400 may then inform the consumer's computer 104 of the result of the transaction (of if the consumer's agent was not authorized to consummate a transaction, to file reports of the matches found) (FIG. 15, block 474).

Thus, the trading house arrangement described above is designed to bring buyers and sellers together more quickly, less expensively, from larger populations, and with greater accuracy than any other existing sales mechanism. Some examples of possible trading house functions include an actual stock exchange, an information clearinghouse, legal services and information, medical services and information, business information, cable programs and movies, yellow pages, catalog sales, classified ads, technical journals, and community-of-interest establishment. By analogy, a trading house can be thought of as a "super bulletin board," with features that distinguish from existing bulletin board systems, e.g., high capacity (millions of buyers and sellers), active merchandise targeting via buying and selling agents that seek each other out, negative pricing (ads that pay), agent-aided negotiation and bidding, trusted agent transaction consummation, trusted identity and anonymity, digital cash transactions, auditable or anonymous transactions, credit histories as private property, automatic royalty tracking, and home banking.

Another extension of trading houses is the automatic formation of on-line communities of interest. Existing on-line services provide "news groups" or "chat groups" dedicated to specific interests, but these must be formed "manually" and then "advertised" by email or word of mouth. The interest-matching, information brokering services discussed above allows a consumer to make a request, such as "please put me in touch with other people interested in electric cars" or even "please put me in touch with other people like myself." Such requests can trigger the automatic formation of an appropriate news group or chat room, and the automatic notification of interested members.

While the invention has been described in connection with what is presently considered to be the most practical and preferred embodiment, it is to be understood that the invention is not to be limited to the disclosed embodiment. For example, although the preferred instantiation of the equipment or "viewer" the consumer uses to communicate with comprises a general-purpose desktop computer or the like, other equipment (e.g. a television with set-top box, or a dedicated display device) could be used instead. Moreover, although the preferred instantiation of the "viewer" is connected to the other components of system 100 via the Internet 102, other forms of connection (e.g., cable TV, on-line systems, local-area networks, wide-area networks, and physically distributed CD-ROMs) are also supported. The invention is intended to cover various modifications and equivalent arrangements included within the spirit and scope of the appended claims.

What is claimed is:

1. In an arrangement comprising plural computers connected to a digital computer network, said network carrying and routing digital information between said plural computers, said plural computers including at least one personal computer associated with at least one user, at least one computer associated with at least one attention broker, at least one computer associated with at least one provider of negatively priced information, and at least one computer associated with at least one provider of positively priced information, said network being decentralized in that any pair of said personal and information provider computers may communicate without said communication passing through any of the other said personal and information provider computers, said personal computer having a display device and at least one user input device, the display device being capable of providing a visual display based at least in part on the digital information delivered to the personal computer via said network, said displayed information including at least one visual link associated with one of said information provider computers, said user being able to operate said user input device to select and activate said link in order to erect a network connection to said information provider computer, a method for permitting the provider of negatively priced information to orthogonally sponsor user purchases of positively priced information, the method comprising:

(1) supplying negatively priced information to the personal computer from at least one negatively priced information provider;

(2) providing said user with the opportunity to receive compensation in connection with said negatively priced information by connecting via the network to said attention broker computer;

(3) compensating, via said attention broker computer, the user in connection with the supplied negatively priced information;

(4) presenting the user, via said personal computer display, with a choice of at least one item of positively priced information, and allowing the user to select said item by operating the user input device;

(5) collecting at least one selection from step (4) and communicating, via the network, said selection to at least one computer associated with a positively priced information provider; and (6) allowing the user to pay for the selected positively priced information at least in part using compensation provided in step (3).

2. A method as in claim 1 wherein said supplying step (1) further includes the steps of:

(a) supplying said negatively priced information from said information provider to said attention broker computer; and (b) selectively delivering the negatively priced information via the computer network from the attention broker computer to the personal computer.

3. A method as in claim 2 wherein supplying step (a) comprises transmitting the negatively priced information from a computer associated with said information provider over the network to said attention broker computer.

4. A method as in claim 1 wherein the method further includes the step of electronically gathering information about the user, developing a user profile based at least in part on the gathered information, and storing the profile in at least one of the said personal computer and the said information provider computers; and wherein the supplying step (1) includes the following steps:

(a) comparing at least one characteristic of the negatively priced information with the user profile, and (b) delivering at least one representation of the negatively priced information to the personal computer over the computer network if the comparing step reveals at least one predetermined relationship between the negatively priced information characteristic and the user profile.

5. A method as in claim 4 wherein the method includes the step of storing the profile in the said attention broker computer.

6. A method as in claim 4 wherein step (b) includes the step of at least one of choosing, conditioning, and customizing at least some of the negatively priced information content based on said user profile.

7. A method as in claim 4 further including the step of providing the user with the capability to edit at least one user profile associated with the user by interacting with the user's associated personal computer.

8. A method as in claim 4 further including the step of providing the user with the capability to condition disclosure of at least part of at least one user profile associated with the user on the provision of compensation to the user for said disclosure.

9. A method as in claim 4 wherein the gathering step includes the step of gathering information relating to the user's use of the computer network to generate a network usage history associated with the user.

10. A method as in claim 9 further including the step of providing the user with the capability to delete at least some of the information in the network usage history by interacting with the user's associated personal computer.

11. A method as in claim 1 wherein the supplying step (1) includes the step of selecting negatively priced information for delivery to said personal computer, the selecting being based at least in part on said user's likelihood to buy products or services associated with the selected negatively priced information.

12. A method as in claim 1 wherein the method further includes the step of detecting interaction between the user and the negatively priced information; and wherein step (3) includes the step of conditioning compensation on the detected interaction.

13. A method as in claim 1 wherein:

step (1) includes the step of delivering an attention indicator requesting user interaction;

step (2) includes the step of collecting the requested user interaction; and step (3) includes the step of conditioning compensation at least in part on the collected interaction.

14. A method as in claim 13 wherein the step of delivering an attention indicator includes delivering at least one of a game, a quiz, a joke, an attention test, a form, and a survey.

15. A method as in claim 1 wherein step (2) includes the steps of:
   (a) displaying a visual indicator on the personal computer display, and
   (b) providing the user an opportunity to select the displayed visual indicator; and
   (c) effecting compensation at least in part in response to said selection.

16. A method as in claim 15 wherein the displaying step (a) includes displaying an icon that resembles a readily recognizable token of value.

17. A method as in claim 15 wherein displaying step (a) includes displaying a symbol resembling a coin.

18. A method as in claim 15 wherein the displayed visual indicator has a network address associated therewith, and the effecting compensation step further includes the step, of transmitting a digital message over the network from the personal computer to the associated network address.

19. A method as in claim 18 wherein the associated network address is specified by a Universal Resource Locator ("URL"), and the transmitting step comprises transmitting the digital message to the destination specified by the URL.

20. A method as in claim 1 wherein the compensation step (3) includes the step of performing at least one electronic financial transaction involving at least one of the said information provider computer and the personal computer.

21. A method as in claim 1 wherein the arrangement includes an attention broker computer connected to the network, and the compensation step (3) includes the step of performing at least one electronic financial transaction involving at least one of the said information provider computer, the said personal computer, and the said attention broker computer.

22. A method as in claim 1 wherein the user has at least one account associated therewith, and the method further includes performing at least one electronic financial transaction that has the effect of depositing value into said account.

23. A method as in claim 22 wherein the financial transaction performing step comprises depositing value into at least one bank account associated with the user.

24. A method as in claim 22 wherein the financial transaction performing step comprises crediting a credit card account associated with the user.

25. A method as in claim 22 wherein the financial transaction performing step comprises modifying a notational account held by a third party on behalf of the user.

26. A method as in claim 1 wherein the compensation step (3) includes the step of delivering digital cash over the computer network to the personal computer.

27. A method as in claim 1 wherein the compensation provided in step (3) is at least one of a form of money, a form of compensation that can be converted to money, a form of currency that can be spent electronically, an addition to a notational account held on behalf of the user, and a key to unlock a digital container.

28. A method as in claim 1 wherein step (4) includes allowing the user to choose at least one of a form of money, and a form of information that can be converted to money.

29. A method as in claim 1 wherein at least steps (1) to (3) are performed in real time, and wherein the compensation provided by step (3) is made available to the user in real time.

30. A method as in claim 1 wherein the arrangement further includes plural providers of negatively priced information, and the method further includes the step of conducting computerized competitive bidding among said information providers for the attention of the user.

31. A method as in claim 1 further including conducting a computerized electronic auction for the attention of the user.

32. A method as in claim 1 wherein the supplying step (1) includes delivering, to the personal computer over the network, negatively priced information selected at least in part by a software agent associated with the user.

33. A method as in claim 1 wherein the arrangement includes plural users, and where step (1) further includes the step of selecting, at least in part using a software agent associated with said information provider, which negatively priced information to deliver to each of said users, and compensating step (3) includes determining, at least in part based on at least one operation of the software agent, the compensation to be supplied in connection with said information.

34. A method as in claim 1 wherein the user has an associated software agent, the negatively priced information provider has an associated software agent, and the method further includes the step of providing the capability for the software agent associated with the user and the software agent associated with the information provider to negotiate over the delivery of an item of negatively priced information and the associated compensation.

35. A method as in claim 1 wherein the computer associated with the negatively priced information provider and the computer associated with the positively priced information provider are the same computer, and step (5) comprises communicating said selection to this computer.

36. A method as in claim 1 wherein the computer associated with the negatively priced information provider and the computer associated with the positively priced information provider are different computers, and where steps (1) through (6) are effected with no communication or business relationship between said providers.

37. A method as in claim 1 wherein step (1) comprises delivering an advertisement.

38. A method as in claim 1 wherein step (1) comprises delivering negatively priced information other than an advertisement.

39. A method as in claim 1 wherein step (1) further includes the step of delivering and saving the negatively priced information in the background, while the user is otherwise engaged, and presenting at least some of the negatively priced information to the user at a later time.

40. A method as in claim 1 wherein said computer network comprises at least one physical computer network connected to at least one other physical computer network by at least one routing device; and wherein at least one of steps (1) through (6) includes the step of transmitting digital data from a device connected to the first physical network to a device connected to the second physical network via said routing device.

41. A method as in claim 1 wherein said personal computer comprises a computer-based device capable of presenting, to a user, at least one of visual, textual and audio information; said device further being capable of accepting, from said user, at least one of textual and graphical input; said computer-based device further being capable of making computational decisions and of storing at least a limited number of said decisions; said device being capable of sending and receiving packets of digital data over said computer network; said device further being capable of presenting, to said user, information supplied by at least one information provider via at least one distribution channel including said computer network, the Internet, the World Wide Web, distributed physical storage media including CD-ROM, on-line systems, cable television, and broadcast television; and wherein the method further includes the step of allowing said user to interact with said device via said presentation capability and said input accepting capability.

42. A method as in claim 41 wherein the user input capability includes at least a pointing device.

43. A method as in claim 42 wherein said pointing device comprises a mouse that controls the position of a cursor displayed on the display.

44. A method as in claim 41 wherein the method further includes the step of supplying information from at least one information provider to the personal computer via at least one distribution channel in addition to the computer network, including at least one of the Internet, the World Wide Web, cable television, broadcast television, distributed physical storage media such as CD-ROM, and on-line systems.

45. In an arrangement comprising plural computers connected to a digital computer network, said network carrying and routing digital information between said plural computers, said plural computers including at least one personal computer associated with at least one user, at least one computer associated with at least one provide of negatively priced information, and at least one computer associated with at least one attention broker, said network being decentralized in that any pair of said personal, information provider, and attention broker computers may communicate without said communication passing through any of the other said personal, information provider, and attention broker computers, said personal computer having a display device and at least one user input device, the display device being capable of providing a visual display based at least in part on the digital information delivered to the personal computer via said network, said displayed information including at least one visual link associated with one of said information provider and attention broker computers, said user being able to operate said user input device to select and activate said link in order to effect a network connection to said associated computer, a method of creating a market in which human attention is the fundamental commodity of value, the method comprising:

(1) generating a list at said attention broker computer of at least one item of negatively priced information from at least one information provider;

(2) establishing a compensation range for each item in said list;

(3) determining which items from said list to make available to the personal computer;

(4) communicating at least one representation of at least one item determined in step (3) to the personal computer via the computer network;

(5) noting said user's interaction with said representation, where said interaction includes selecting and activating a visual link that is contained within said representation and that is associated with said negatively priced information provider computer, thereby connecting the personal computer via the network to said negatively priced information provider computer and receiving said negatively priced information from said computer; and (6) compensating, via said attention broker computer, the user in connection with said interaction in accordance with the range determined in step (2).

46. A method as in claim 45 wherein said determining step (3) includes the steps of:

(a) delivering at least one representation of at least one item from said list to the personal computer from the attention broker over the computer network; and (b) providing the capability for said user to select among said representations; and (c) communicating at least one of said selections from the personal computer to the attention broker via the computer network.

47. A method as in claim 45 wherein the determining step (3) includes the steps of:

(a) electronically gathering information about the user, developing a user profile based at least in part on the gathered information, and storing the profile in at least one of the said personal, information provider, and attention broker computers;

(b) comparing the user profile with at least one characteristic of each said item of negatively priced information; and (c) determining in the affirmative if the comparing step reveals at least one predetermined relationship between the negatively priced information characteristic and the user profile.

48. A method as in claim 47 wherein step (c) further includes the step of at least one of choosing, conditioning, and customizing at least some of the content of the determined negatively priced information based on said user profile.

49. A method as in claim 47 wherein the method further includes the step of providing the user with the capability to edit at least one user profile associated with the user by interacting with the user's associated personal computer.

50. A method as in claim 47 further including the step of providing the user with the capability to condition disclosure of at least part of at least one user profile associated with the user on the provision of compensation to the user for said disclosure.

51. A method as in claim 47 wherein the gathering step includes the step of gathering information relating to the user's use of the computer network to generate a network usage history associated with the user.

52. A method as in claim 51 further including the step of providing the user with the capability to delete at least some of the information in the network usage history by interacting with the user's associated personal computer.

53. A method as in claim 45 wherein the determining step (3) includes the step of selecting negatively priced information for delivery to said personal computer, the selecting being based at least in part on said user's likelihood to buy products or services associated with the selected negatively priced information.

54. A method as in claim 45 wherein said negatively priced information comprises a form of attention test for previously delivered information; and wherein step (5) further includes the step of responding to said attention test.

55. A method as in claim 45 wherein:

step (4) includes the step of delivering an attention indicator requesting user interaction;

step (5) includes the step of noting the requested user interaction; and step (6) includes the step of conditioning compensation at least in part on the collected interaction.

56. A method as in claim 55 wherein the step of delivering an attention indicator includes delivering at least one of a game, a quiz, a joke, an attention test, a form, and a survey.

57. A method as in claim 45 wherein compensation step (6) includes the steps of
   (a) displaying a visual indicator on the personal computer display, and
   (b) providing the user an opportunity to select the displayed visual indicator; and
   (c) effecting compensation at least in part in response to said selection.

58. A method as in claim 57 wherein the displaying step (a) includes displaying an icon that resembles a readily recognizable token of value.

59. A method as in claim 57 wherein displaying step (a) includes displaying a symbol resembling a coin.

60. A method as in claim 57 wherein the displayed visual indicator has a network address associated therewith, and step (c) further includes the step, of transmitting a digital message over the network from the personal computer to the associated network address.

61. A method as in claim 60 wherein the associated network address is specified by a Universal Resource Locator ("URL"), and the transmitting step comprises transmitting the digital message to the destination specified by the URL.

62. A method as in claim 45 wherein said compensation step (6) includes the step of performing at least one electronic financial transaction with at least one of the said attention broker computer, the said information provider computer, and the said personal computer.

63. A method as in claim 45 wherein the user has at least one account associated therewith, and the method further includes performing at least one electronic financial transaction that has the effect of depositing value into said account.

64. A method as in claim 63 wherein the financial transaction performing step comprises depositing value into at least one bank account associated with the user.

65. A method as in claim 63 wherein the financial transaction performing step comprises crediting a credit card account associated with the user.

66. A method as in claim 63 wherein the financial transaction performing step comprises modifying a notational account held by a third party on behalf of the user.

67. A method as in claim 45 wherein the compensation step (6) includes the step of delivering digital cash over the computer network to the personal computer.

68. A method as in claim 45 where the compensation provided in step (6) is at least one of a form of money, a form of compensation that can be converted to money, a form of currency that can be spent electronically, an addition to a notational account held on behalf of the user, and a key to unlock a digital container.

69. A method as in claim 45 where the compensation provided in step (6) is in the form of information of value to the user.

70. A method as in claim 45 wherein step (5) is performed in real time with step (6), and wherein the compensation is made available to the user in real time.

71. A method as in claim 45 wherein the arrangement further includes plural providers of negatively priced information, and the method further includes the step of conducting computerized competitive bidding among said information providers for the attention of the user.

72. A method as in claim 45 further including conducting a computerized electronic auction for the attention of the user.

73. A method as in claim 45 wherein step (3) includes determining, at least in part using a software agent associated with said user, which negatively priced information to deliver to said user.

74. A method as in claim 45 wherein the arrangement includes plural users, and where step (2) further includes the step of determining, at least in part using a software agent associated with said information provider, the compensation range associated with each item of negatively priced information, and step (3) includes determining, at least in part based on at least one operation of the software agent, which negatively priced information to deliver to each of said users.

75. A method as in claim 45 wherein the user has an associated software agent, the negatively priced information provider has an associated software agent, and the method further includes the step of providing the capability for the software agent associated with the user and the software agent associated with the information provider to negotiate over the delivery of an item of negatively priced information and the associated compensation range.

76. A method as in claim 45 wherein the computer associated with the negatively priced information provider and the computer associated with the attention broker are the same computer, and step (1) is performed at least in part at this computer.

77. A method as in claim 45 wherein the computer associated with the negatively priced information provider and the computer associated with the attention broker are different computers, and wherein at least one of steps (1) through (6) is effected via direct communication between the user computer and the computer associated with the provider of negatively priced information without the said communication passing through the attention broker computer.

78. A method as in claim 45 wherein step (4) comprises delivering an advertisement.

79. A method as in claim 45 wherein step (4) comprises delivering negatively priced information other than an advertisement.

80. A method as in claim 45 wherein step (4) further includes the step of delivering and saving the negatively priced information in the background, while the user is otherwise engaged, and presenting at least some of the negatively priced information to the user at a later time.

81. A method as in claim 45 wherein said computer network comprises at least one physical computer network connected to at least one other physical computer network by at least one routing device; and wherein the method further includes the step of transmitting data from a device connected to the first physical network to a device connected to the second physical network via said routing device.

82. A method as in claim 45 wherein said personal computer comprises a computer-based device capable of presenting, to a user, at least one of visual, textual and audio information; said device further being capable of accepting, from said user, at least one of textual and graphical input; said computer-based device further being capable of making computational decisions and of storing at least a limited number of said decisions; said being capable of sending and receiving packets of digital data over said computer network; said device further being capable of presenting, to said user, information supplied by at least one information provider via at least one distribution channel including said computer network, distributed physical storage media including CD-ROM, on-line systems, cable television, and broadcast television; and wherein the method further includes the step of allowing said user to interact with said device via said presentation capability and said input accepting capability.

83. A method as in claim 82 wherein the user input capability includes at least a pointing device.

84. A method as in claim 83 wherein said pointing device comprises a mouse that controls the position of a cursor displayed on the display.

85. A method as in claim 82 wherein the method further includes the step of supplying information from at least one information provider to the personal computer via at least one distribution channel in addition to the computer network, including at least one of cable television, broadcast television, distributed physical storage media such as CD-ROM, and on-line systems.

86. A method as in claim 45 wherein step (2) establishes a compensation range that may vary from at least one of (a) user to user, (b) item to item, and (c) time to time.

* * * * *

UNITED STATES PATENT AND TRADEMARK OFFICE
CERTIFICATE OF CORRECTION

PATENT NO. : 5,794,210

DATED : August 11, 1998

INVENTOR(S) : A. Nathaniel Goldhaber and Gary Fitts

It is certified that error appears in the above-indentified patent and that said Letters Patent is hereby corrected as shown below:

Column 8, line 23, after "cyberspace", insert --.--.

Column 11, line 62, delete the space between "i" and "s"

Column 13, line 16, after "be", insert --_____--.

Column 13, line 23, after "be", insert --_____--.

Column 15, line 21, after "area,", delete "a specific demographic area,".

Column 18, line 11, replace "1A" with --11A--.

Column 18, line 13, replace "11O" with --110--.

Column 18, line 15, after "62", insert --.--

Column 18, line 15, replace "a" with --A--.

Column 18, line 16, after "consumer", insert --. --.

Column 18, line 28, replace "compute" with --computer--.

Column 18, line 34, replace "12" with --13--.

Column 19, line 10, replace "compute" with --computer--.

Column 19, line 48, after "of", insert --the--.

Column 19, line 58, replace "compute" with --computer--.

UNITED STATES PATENT AND TRADEMARK OFFICE
CERTIFICATE OF CORRECTION

PATENT NO. : 5,794,210
DATED : August 11, 1998
INVENTOR(S) : A. Nathaniel Goldhaber and Gary Fitts It is certified that error appears in the above-indentified patent and that said Letters Patent is hereby corrected as shown below:

Column 20, line 7, replace "don's" with --don't--.

Column 20, line 33, replace "of" with --or--.

Signed and Sealed this

Twenty-third Day of November, 1999

Q. TODD DICKINSON

*Attest:*

*Attesting Officer*     *Acting Commissioner of Patents and Trademarks*